(12) United States Patent
Catreux-Erceg et al.

(10) Patent No.: US 7,483,718 B2
(45) Date of Patent: Jan. 27, 2009

(54) SYSTEM AND METHOD FOR ANTENNA SELECTION

(75) Inventors: Severine Catreux-Erceg, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation, Irvine, CA (US)

( * ) Notice: Subject to any disclaimer, the term of this patent is extended or adjusted under 35 U.S.C. 154(b) by 820 days.

(21) Appl. No.: 10/957,398

(22) Filed: Oct. 1, 2004

(65) Prior Publication Data

US 2005/0075081 A1 Apr. 7, 2005

Related U.S. Application Data

(60) Provisional application No. 60/507,843, filed on Oct. 1, 2003.

(51) Int. Cl.
*H04B 1/38* (2006.01)
*H04M 1/00* (2006.01)

(52) U.S. Cl. .................. 455/562.1; 455/103; 455/277.2

(58) Field of Classification Search .................. 455/69, 455/562.1, 101, 102, 103, 132, 133, 135, 455/137, 272, 273, 277.1, 277.2; 375/347
See application file for complete search history.

(56) References Cited

U.S. PATENT DOCUMENTS 6,774,864 B2 * 8/2004 Evans et al. .................. 343/853

| 2002/0051435 | A1 | 5/2002 | Giallorenzi et al. |
| 2002/0102950 | A1 | 8/2002 | Gore et al. |
| 2002/0197998 | A1 | 12/2002 | Schmidt |
| 2003/0162519 | A1* | 8/2003 | Smith et al. ............... 455/277.1 |
| 2004/0196919 | A1* | 10/2004 | Mehta et al. ................. 375/267 |
| 2005/0074080 | A1 | 4/2005 | Catreux et al. |
| 2005/0075081 | A1 | 4/2005 | Catreux-Erceg et al. |
| 2005/0090205 | A1 | 4/2005 | Catreux |
| 2005/0141630 | A1 | 6/2005 | Catreux et al. |
| 2006/0176974 | A1* | 8/2006 | Smith et al. .................. 375/267 |

OTHER PUBLICATIONS

P.W. Wolniasky et al., "V-BLAST: An Architecture for Realizing Very High Data Rates over the Rich-scattering Wireless Channel," Proceedings of URSI ISSE, Bell Laboratories, Lucent Technologies, Crawford Hill Laboratory, Holmdel, NJ, Sep. 1998, pp. 295-300.

(Continued)

*Primary Examiner*—Nguyen Vo
(74) *Attorney, Agent, or Firm*—McAndrews, Held & Malloy, Ltd.

(57) ABSTRACT

Systems and methods that provide antenna selection in multi-antenna-element communication systems are provided. In one embodiment, a system that selects N antenna elements in an M-antenna-element transmitter or an M-antenna-element receiver, in which N is less than M, may include, for example, M antenna elements in the M-antenna-element transmitter or the M-antenna-element receiver; N RF chains; and a switch coupled to the N RF chains. The M-antenna-element receiver may determine a bit error rate for each possible N antenna element subset of the M antenna elements. The M-antenna-element receiver may determine the particular N antenna element subset with a lowest bit error rate. In response to the determination of the particular N antenna element subset with the lowest bit error rate, the switch may couple the N RF chains to the particular N antenna element subset with the lowest bit error rate.

39 Claims, 8 Drawing Sheets

OTHER PUBLICATIONS

S. Catreux, et al., "Adaptive Modulation and MIMO Coding for Broadband Wireless Data Networks," *IEEE Communications Magazine*, vol. 40, No. 6, Jun. 2002, pp. 108-115.

S. Haykin, Adaptive Filter Theory, 3rd Ed., Prentice Hall, 1996, pp. 194-206.

Anders Furuskär et al., "EDGE: Enhanced Data Rates for GSM and TDMA/136 Evolution," IEEE Personal Communications Magazine, vol. 6, Issue 3, Jun. 1999, pp. 56-66.

Jack H. Winters, et al., "The Impact of Antenna Diversity on the Capacity of Wireless Communication Systems," IEEE Transactions on Communications, vol. 42, No. 2/3/4, Feb.,Mar., Apr. 1994, pp. 1740-1751.

Chen-Nee Chuah, et al., "Capacity of Multi-antenna Array Systems in Indoor Wireless Environment," Proceedings of Globecom'98 Sydney, Australia, IEEE 1998, pp. 1894-1899.

G.J. Foschini, et al., "On Limits of Wireless Communications in a Fading Environment when Using Multiple Antennas," Kluwer Academic Publishers, vol. 6, No. 3, Mar. 1998, pp. 311-335.

G.J. Foschini, et al., "Simplified Processing for High Spectral Efficiency Wireless Communication Employing Multi-element Arrays," IEEE Journal on Selected Areas in Communications, vol. 17, Issue 11, Nov. 1999, pp. 1841-1852.

Andreas F. Molisch, et al., "Capacity of MIMO Systems with Antenna Selection," Proceedings of IEEE ICC, Helsinki, Finland, Jun. 1001, vol. 2, pp. 570-574.

Rick S. Blum, et al., "On Optimum MIMO with Antenna Selection," IEEE Communications Letters, vol. 6, Issue 8, Aug. 2002, pp. 322-324.

Jack H. Winters, "Optimum Combining for Indoor Radio Systems with Multiple Users," IEEE Transactions on Communications, vol. COM-35, No. 11, Nov. 1987, pp. 1222-1230.

S.M. Alamouti, "A Simple Transmit Diversity Technique for Wireless Communications," IEEE Journal on Selected Areas in Communications, vol. 16, Issue 8, Oct. 1998, pp. 1451-1458.

Jan-Jaap Van De Beek, et al., "On Channel Estimation in OFDM Systems," IEEE 45th Vehicular Technology conference, vol. 2, Jul. 25-28, 1995, pp. 815-819.

Apurva N. Moday, et al., "Synchornization for MIMO of OFDM Systems," IEEE Globecom 2001, vol. 1, pp. 509-513.

Severine Catreux, et al. "Adaptive Modulation and MIMO Coding for Broadband Wireless Data Networks," IEEE Blobecom 2001, vol. 1, pp. 108-115.

John G. Proakis, Digital Communications, 3rd Edition, McGraw Hill Series 1995, pp. 257-260, 269-274 and 278-282.

Jorgen B. Andersen, "Antenna Arrays in Mobile Communications: Gain, Diversity, and Channel Capacity," IEEE Antennas and Propagation Magazine, vol. 42, No. 2, Apr. 2000, pp. 12-16.

IEEE 802.11a Standard, 1999.

IEEE 802.11g Standard, Jun. 27, 2003.

Da-Shan Shiu, et al., "Fading Correlation and Its Effect on the Capacity of Multielement Antenna Systems," IEEE Transactions on Communications, Mar. 2000, vol. 48, No. 3, pp. 502-513.

\* cited by examiner

SYSTEM AND METHOD FOR ANTENNA SELECTION

CROSS REFERENCE TO RELATED APPLICATION

This application makes reference to, claims priority to and claims benefit from U.S. patent application Ser. No. 60/507,843, entitled "Antenna Selection Method in Multi-Antenna Communication Systems Based On Minimum Bit Error Rate" and filed Oct. 1, 2003. The above-referenced patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of "smart" antenna techniques. Smart antenna techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11a/g) maybe improved.

At least some of the impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al., IEEE Transactions on Communications, vol. 42, no. 2/3/4, pages 1740-1751, February 1994. Such diversity gains improve system performance by mitigating multipath for more uniform coverage, increasing received signal-to-noise ratio for greater range or reduced required transmit power, and providing more robustness against interference or permitting greater frequency reuse for higher capacity.

Within communication systems incorporating multi-antenna receivers, a set of M receive antennas may be capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users", by J. H. Winters, IEEE Transactions on Communications, vol. COM-35, no. 11, November 1987; "Capacity of Multi-Antenna Array Systems In Indoor Wireless Environment", by C. Chuah et al., Proceedings of Globecom '98 Sydney, Australia, IEEE 1998, pages 1894-1899 November 1998; and "Fading Correlation and Its Effect on the Capacity of Multi-Element Antenna Systems" by D. Shiu et al., IEEE Transactions on Communications, vol. 48, no. 3, pages 502-513, March 2000.

Some multi-element antenna arrangements (e.g., some MIMOs) provide system capacity enhancements that can be achieved using the above-referenced configurations. Under the assumption of perfect estimates of the applicable channel at the receiver, in a MIMO system the received signal decomposes to M "spatially-multiplexed" independent channels. This results in an M-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al., Wireless Personal Communications, Kluwer Academic Publishers, vol. 6, no. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini et al., IEEE Journal on Selected Areas in Communications, vol. 17, issue 11, November 1999, pages 1841-1852.

Although increasing the number of transmit and/or receive antennas enhances various aspects of the performance of MIMO systems, the provision of a separate RF chain for each transmit and receive antenna increases costs. Each RF chain is generally comprised a low noise amplifier, filter, downconverter, and analog-to-digital converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase.

Some attempts to address these shortcomings may be found, for example, in United States Patent Publication No. 20020102950 entitled "Method and apparatus for selection and use of optimal antennas in wireless systems"; "Capacity of MIMO systems with antenna selection", by A. Molisch et al., Proceedings of IEEE ICC, Helsinki, Finland, June 2001, vol. 2, pp. 570-574; and "On optimum MIMO with antenna selection", by R. S. Blum et al., IEEE Communications Letters, vol. 6, issue 8, August 2002, pages 322-324, in which a subset of transmit/receive antennas are selected from a larger number of antennas. Since with N-fold spatial multiplexing, at least N RF chains must be used, typically N out of M total antennas would be chosen at the receiver and/or N out of $n_T$ total antennas would be chosen at the transmitter, with M>N and $n_T$>N.

The performance of a system with antenna selection depends, for example, on the criteria used in the selection process. Different criteria used even under the same channel condition may well result in a different selected subset of antennas, thereby yielding different performances. Some of the above-reference documents advocate the maximum capacity criterion to select the antenna subset. However, capacity is an idealized quantity that may be an unachievable bound because it may necessitate perfect coding and/or equalization and/or continuous modulation. In practice, the equalizer is not ideal, limited coding (or even no coding) and quantized modulation is used.

BRIEF SUMMARY OF THE INVENTION

Some aspects of the present invention may relate to systems and methods that provide antenna selection in multi-antenna-element communication systems. Some embodiments according to some aspects of the present invention may select antenna-element subsets in multi-antenna-element transmitters and/or multi-antenna-element receivers.

In one embodiment according to some aspects of the present invention, a system that selects N antenna elements in an M-antenna-element transmitter or an M-antenna-element receiver, in which N is less than M, may include, for example, M antenna elements in the M-antenna-element transmitter or the M-antenna-element receiver; N RF chains; and a switch coupled to the N RF chains. The M-antenna-element receiver may determine a bit error rate for each possible N antenna element subset of the M antenna elements. The M-antenna-element receiver may determine the particular N antenna element subset with a lowest bit error rate. In response to the determination of the particular N antenna element subset with the lowest bit error rate, the switch may couple the N RF chains to the particular N antenna element subset with the lowest bit error rate.

In another embodiment according to some aspects of the present invention, a method that selects N antenna elements in an M-antenna-element transmitter or an M-antenna-element receiver, in which N is less than M, may include, for example, one or more of the following: determining a bit error rate for each possible N antenna element subset of a set of M-antenna elements of the M-antenna element transmitter or the M-antenna-element receiver; determining the particular N antenna element subset with a lowest bit error rate; and, in response thereto, coupling N RF chains of the M-antenna-element transmitter or the M-antenna-element receiver to the particular N antenna element subset with the lowest bit error rate.

In yet another embodiment according to some aspects of the present invention, in a receiver having one or more RF chains and a first plurality of receive antennas, a method that selects a subset of the first plurality of receive antennas to receive a transmitted RF signal, may include, for example, one or more of the following: establishing a second plurality of possible subsets of the first plurality of receive antennas; determining a second plurality of output bit error rates of the receiver corresponding to the second plurality of possible subsets of the first plurality of receive antennas; identifying a minimum of the second plurality of output bit error rates; selecting one of the second plurality of possible subsets of the first plurality of receive antennas corresponding to the minimum of the second plurality of output bit error rates; and connecting the one or more RF chains to the receive antennas of the selected one of the second plurality of possible subsets.

In yet another embodiment according to some aspects of the present invention, in a transmitter having one or more RF chains and a first plurality of transmit antennas, a method that selects a subset of the first plurality of transmit antennas for transmission of an RF signal as a corresponding plurality of RF output signals subsequently received by a receiver, may include, for example, one or more of the following: establishing a second plurality of possible subsets of the first plurality of transmit antennas; determining a second plurality of output bit error rates of the receiver corresponding to the second plurality of possible subsets of the first plurality of transmit antennas; identifying a minimum of the second plurality of output bit error rates; selecting one of the second plurality of possible subsets of the first plurality of transmit antennas corresponding to the minimum of the second plurality of output bit error rates; and connecting the one or more RF chains to the transmit antennas of the selected one of the second plurality of possible subsets.

In yet another embodiment according to some aspects of the present invention, in a communication system including a transmitter having a plurality of transmit antennas disposed to transmit a set of spatially-multiplexed RF output signals through a channel using two or more transmit RF chains and a receiver having a plurality of receive antennas disposed to receive the set of spatially-multiplexed RF output signals and to responsively generate a set of spatially-multiplexed received RF signals processed by two or more receive RF chains, an antenna selection method may include, for example, one or more of the following: establishing possible subsets of the plurality of transmit antennas and possible subsets of the plurality of receive antennas; determining one or more output bit error rates of the receiver corresponding to combinations of ones of the possible subsets of the plurality of transmit antennas and ones of the possible subsets of the plurality of receive antennas; identifying a minimum of the one or more output bit error rates; and selecting one of the possible subsets of the plurality of transmit antennas and one of the possible subsets of the plurality of receive antennas collectively corresponding to the minimum of the one or more output bit error rates; and connecting the two or more of the transmit RF chains to the selected one of the possible subsets of the plurality of transmit antennas and the two or more receive RF chains to the selected one of the possible subsets of the plurality of receive antennas.

In yet another embodiment according to some aspects of the present invention, in a communication system including a transmitter having a plurality of transmit antennas disposed to transmit a set of RF output signals through a channel using one or more transmit RF chains and a receiver having a plurality of receive antennas disposed to receive the set of RF output signals and to responsively generate a set of received RF signals processed by one or more receive RF chains, an antenna selection method may include, for example, one or more of the following: establishing possible subsets of the plurality of transmit antennas and possible subsets of the plurality of receive antennas; determining one or more output bit error rates of the receiver corresponding to combinations of ones of the possible subsets of the plurality of transmit antennas and ones of the possible subsets of the plurality of receive antennas; identifying a minimum of the one or more output bit error rates; selecting one of the possible subsets of the plurality of transmit antennas and one of the possible subsets of the plurality of receive antennas collectively corresponding to the minimum of the one or more output bit error rates; and connecting the one or more of the transmit RF chains to the selected one of the possible subsets of the plurality of transmit antennas and the one or more receive RF chains to the selected one of the possible subsets of the plurality of receive antennas.

In yet another embodiment according to some aspects of the present invention, in a receiver having one or more RF chains and a plurality of receive antennas capable of receiving transmitted RF signal energy, an antenna selection method may include, for example, one or more of the following: connecting the one or more RF chains to an initial subset of the plurality of receive antennas; determining a bit error rate associated with each receive antennas within the initial subset of the plurality of receive antennas; comparing each the bit error rate to a predefined threshold; disconnecting, when one the bit error rate exceeds the predefined threshold, an associated receive antenna within the initial subset of the plurality of receive antennas from a first of the one or more RF chains; and connecting one of the first plurality of receive antennas to the first of the one or more RF chains, the one of the first plurality of receive antennas not being included within the initial subset of the plurality of receive antennas.

In yet still another embodiment according to some aspects of the present invention, in a transmitter having one or more RF chains and a plurality of transmit antennas capable of transmitting RF signal energy to a receiver, an antenna selection method may include, for example, one or more of the following: connecting the one or more RF chains to an initial subset of the plurality of transmit antennas; determining a bit error rate of the receiver associated with each transmit antennas within the initial subset of the plurality of transmit antennas; comparing each the bit error rate to a predefined threshold; disconnecting, when one the bit error rate exceeds the predefined threshold, an associated transmit antenna within the initial subset of the plurality of transmit antennas from a first of the one or more RF chains; and connecting one of the first plurality of transmit antennas to the first of the one or more RF chains, the one of the first plurality of transmit antennas not being included within the initial subset of the plurality of transmit antennas.

DETAILED DESCRIPTION OF THE INVENTION

Figure 1A:
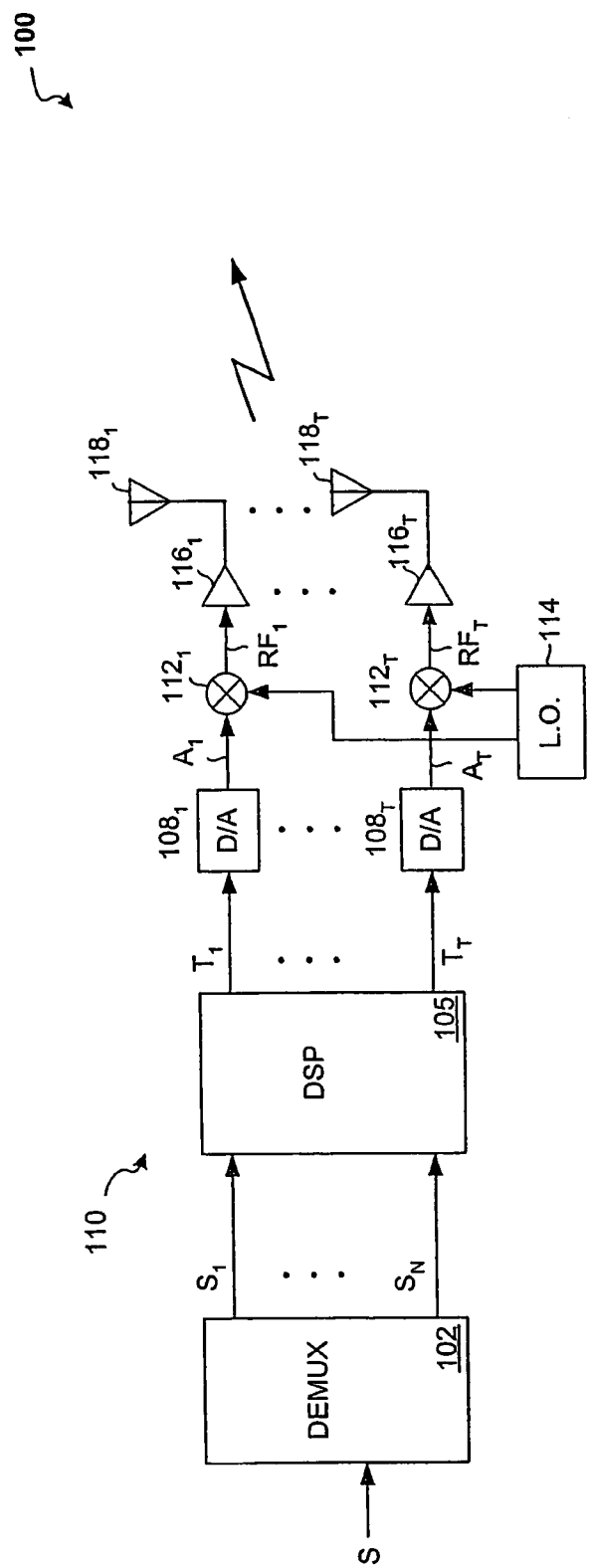
FIGS. 1A-B show an embodiment of a conventional MIMO communication system.

I. Overview of Some Aspects of the Present Invention

Some embodiments according to some aspects of the present invention may relate to communication systems that use a transmitter and/or a receiver that have multiple antenna elements.

Some embodiments according to some aspects of the present invention may be implemented to facilitate the selection of a subset of antenna elements in one or more multi-antenna wireless communication devices so as to minimize or to optimize a bit error rate (BER).

Some embodiments according to some aspects of the present invention may be employed to select a subset of antenna elements of a multi-antenna transmitter to transmit a signal and/or to select a subset of antenna elements of a multi-antenna receiver to receive a signal.

Some embodiments according to some aspects of the present invention may provide that the selection of the subset of antenna elements is predicated, at least in part, upon a minimization of a BER.

Some embodiments according to some aspects of the present invention may be used for antenna selection in a multiple-input-multiple-output (MIMO) communication system. The MIMO communication system may provide, for example, a transmitter that broadcasts a plurality (N) of spatially-multiplexed signals through N transmit antenna elements selected from a set of $n_T$ antenna elements, where $n_T > N$. The MIMO communication system may provide, for example, a receiver in which N receive antenna elements, selected from a total of M elements where M>N, form a number of output signals equal to the number of spatially-multiplexed signals. The output signals are in turn provided to corresponding RF chains for processing at baseband. Thus, some embodiments according to some aspects of the present invention may advantageously permit minimization of BER and/or reduction of RF signal processing costs within multiple-antenna systems.

Some embodiments of an antenna selection method according to some aspects of the present invention may be used with different types of multi-antenna communication systems. In particular embodiments, some embodiments of an antenna selection method according to some aspects of the present invention may be applied, for example, to a multi-antenna receiver within a "single channel" (SC) system (e.g., a system without spatial multiplexing), to a multi-antenna transmitter in a single channel system, or to the transmitter and/or receiver of a MIMO system employing spatial multiplexing (SM) or single channel.

Some embodiments according to some aspects of the present invention may provide, for example, a number N of receive antenna elements that are selected from a set of M available antenna elements (where M>N) such that the selected subset of antenna elements minimizes the BER. This may be effected, for example, by first estimating the BER of all possible multi-antenna subsystems, each of which is comprised of a subset of the M antenna elements. Since the BER is generally a complicated function of, for example, the applicable communication channel, in certain implementations BER may be approximated for a given channel and/or antenna combining technique such that it varies with the coding and/or modulation method employed. Once the BER is estimated for each multi-antenna subsystem, the one yielding the minimum value of BER is identified. The receive antenna elements of the identified subset are then connected to multiple RF chains of the receiver to enable reception of the incoming wireless signal.

A substantially similar approach may be used to select a subset of N transmit antenna elements within a multi-antenna transmitter structure comprising $n_T$ transmit elements, where $n_T > N$. Again, the BER may be estimated at the receiver with respect to each of the possible multi-antenna subsystems existing at the transmitter. The receiver then informs the transmitter (e.g., via a feedback path) of the identity of the subsystem yielding the minimum BER. This subset is then connected to the multiple RF chains of the transmitter in order to enable transmission of the wireless signal. A similar approach may be used for antenna selection when multiple antennas are used at both transmitter and receiver in a single-channel multiple-input-multiple-output (MIMO) system.

Some embodiments according to some aspects of the present invention may be used for antenna selection in a MIMO communication system having a transmitter operative to broadcast a number (N) of spatially-multiplexed signals using a subset of N transmit antenna elements selected from $n_T$ available transmit antenna elements, where $n_T>N$. In this case the receiver uses a subset of N receive antenna elements selected from a set of M receive antenna elements (where M>N). The resulting set of N output signals are then fed to a corresponding RF chain for processing at baseband. Some embodiments according to some aspects of the present invention thus enable minimization of output BER and RF processing costs within multi-antenna systems.

In the case of a single-channel or spatially-multiplexed MIMO system which uses multiple RF chains at transmit and/or receiver side, certain baseband weighting and combining arrangements may be incorporated within the transmitter (e.g., precoding) and/or receiver together with the selection method. For example, the baseband weights and antenna selection may be both designed such that they contribute to minimize the BER. In another example, the baseband weights may be designed to maximize, for example, an output signal-to-noise ratio (SNR), a signal-to-interference-and-noise ratio (SINR), or a capacity while minimizing BER through appropriate antenna selection.

Some embodiments according to some aspects of the present invention may also be employed in systems lacking the capability to determine the BER associated with all of the antenna elements of a given transmitter and/or receiver in the manner described above. For example, certain systems may not be equipped with a training sequence structure permitting training signature information to be collected "in parallel" for each of the antennas of a particular device for the same channel realization. In this case, the BER of a subset of the total number of antennas (e.g., the active antennas) is estimated and compared to a pre-selected threshold. As soon as the BER of one or more of the active antennas exceeds the threshold, another antenna is selected and connected to the RF chain to replace it. This approach may be employed to facilitate antenna selection within transmitters and/or receivers as well within the context of any of the multi-antenna environments described herein.

Some embodiments according to some aspects of the present invention are directed to a method for antenna selection based upon minimizing the BER for use in multi-antenna systems, including, for example, N-fold spatially-multiplexed multi-antenna systems. To facilitate appreciation of some embodiments according to some aspects of the present invention, an overview is provided of exemplary architectures for implementing antenna selection within multi-antenna systems.

II. Architecture for Antenna Selection

Some embodiments according to some aspects of the present invention may be implemented in wireless communication systems in which a smaller number of RF chains are used within a transmitter and/or receiver than the number of transmit/receiver antennas utilized. In some embodiments according to some aspects of the present invention, a number N of receive antenna elements is selected out of a total number of elements M, where M>N. This forms N RF output signals, which are then passed through N RF chains. In an exemplary implementation, each RF chain includes, for example, a filter, downconverter, and A/D converter. The output signals produced by the A/D converter of each RF chain are then digitally processed to generate the N spatially-multiplexed output signals. By performing the requisite selection of a subset of antennas at RF, an N-fold spatially-multiplexed system having more than N receive antennas, but only N RF chains, can be realized at a cost similar to that of a system having N receive antennas. Accordingly, receiver performance may be improved through use of additional antennas at relatively low cost.

A similar technique can be used at a transmitter incorporating N RF chains and a number $n_T$ of transmit antennas that is greater than N. In an exemplary implementation the N RF chains are followed by a switch which connects each of them to a subset of N transmit antennas selected out of $n_T$. As at the receiver, by performing such selection of a subset of antennas at RF, an N-fold spatially-multiplexed system having more than N transmit antennas, but only N RF chains, can be realized at a cost similar to that of a system having N transmit antennas and N RF chains. Accordingly, transmitter performance may be improved through use of additional antennas at relatively low cost.

A. Spatial Multiplexing

According to some embodiments according to some aspects of the present invention, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., a time slot, a frequency or a code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permit the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, vol. COM-35, no. 11, November 1987, which is hereby incorporated herein by reference in its entirety.

B. Conventional MIMO System

Figure 1B:
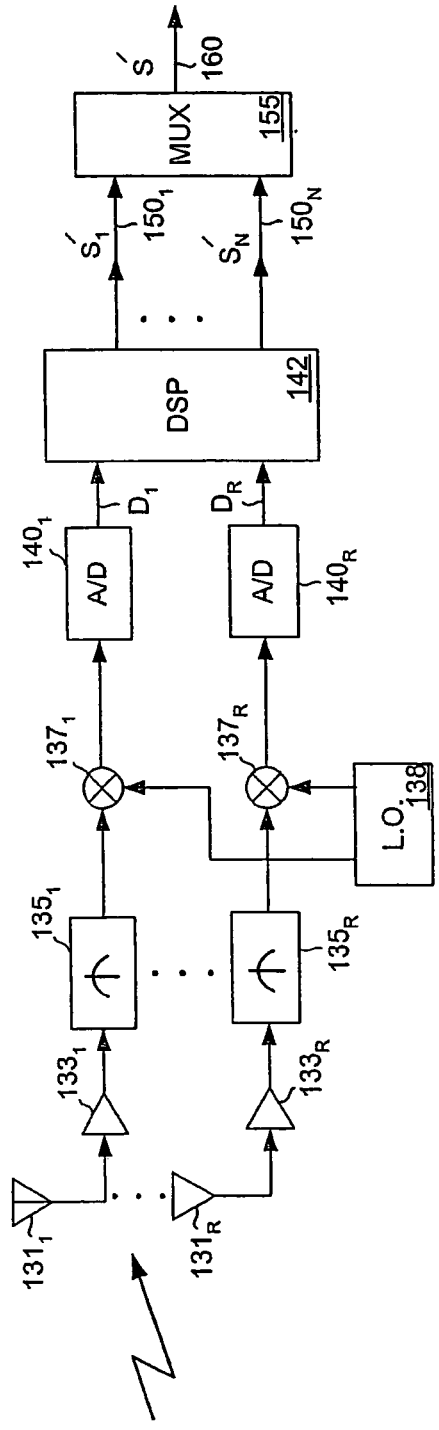

Some aspects of the present invention may be more fully elucidated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it may be assumed that either (i) T is greater than N and R is equal to N; (ii) T is equal to N and R is greater than N; or (iii) both T and R are greater than N.

Referring to FIG. 1A, an input signal S to be transmitted, which typically includes of a stream of digital symbols, is demultiplexed by demultiplexer 102 into N independent substreams $S_{1, 2, \ldots, N}$. The substreams $S_{1, 2, \ldots, N}$ are then sent to digital signal processor (DSP) 105, which generates a set of T output signals $T_{1, 2, \ldots, T}$. The T output signals $T_{1, 2, \ldots, T}$ are typically generated from the N substreams $S_{1, 2, \ldots, N}$ by weighting (e.g., multiplying by a complex number) each of the N substreams $S_{1, 2, \ldots, N}$ by T different weighting coefficients to form NT substreams. These N·T substreams are then combined in order to form the T output signals $T_{1, 2, \ldots, T}$. The T output signals $T_{1, 2, \ldots, T}$ are then converted to T analog signals $A_{1, 2, \ldots, T}$ using a set of T digital-to-analog (D/A) converters 108. Each of the T analog signals $A_{1, 2, \ldots, T}$ is then upconverted to the applicable transmit carrier RF frequency within a mixer 112 by mixing with a signal provided by a local oscillator 114. The resulting set of T RF signals (e.g., $RF_{1, 2, \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each downconverted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2, \ldots, R}$ are then weighted and combined using digital signal processor 142 to form N spatially-multiplexed output signals $S'_{1, 2, \ldots, N}$ which comprise estimates of the transmitted signals $S_{1, 2, \ldots, N}$. The N output signals $S'_{1, 2, \ldots, N}$ are then multiplexed using a multiplexer 155 in order to generate an estimate 160 (S') of the original input signal S.

C. Antenna Selection at RF in Spatially-Multiplexed Communication Systems

Turning now to FIG. 2, there is shown a block diagram of a MIMO communication system 200 having a transmitter 210 and receiver 250 configured to effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, some embodiments according to some aspects of the present invention may provide that MT and/or MR are greater than or equal to N. For example, (i) MT is greater than N and MR is equal to N; (ii) MT is equal to N and MR is greater than N; or (iii) both MT and MR are greater than N.

Figure 2A:
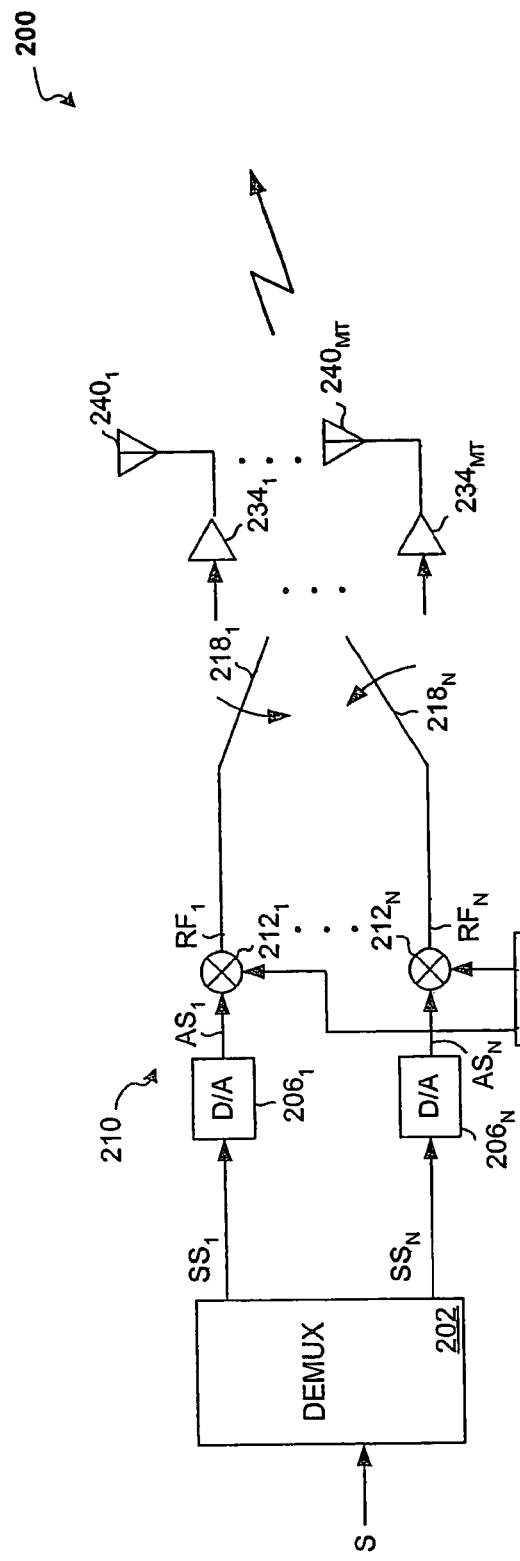
FIGS. 2A-B show an embodiment of a MIMO system according to some aspects of the present invention.

As shown in FIG. 2A, an input signal S to be transmitted is demultiplexed by demultiplexer 202 into N independent substreams $SS_{1, 2, \ldots, N}$. The substreams $SS_{1, 2, \ldots, N}$ are then converted to N analog substreams $AS_{1, 2, \ldots, N}$ using a corresponding set of D/A converters 206. Next, the N analog substreams $AS_{1, 2, \ldots, N}$ are upconverted to the applicable transmit carrier RF frequency using a set of mixers 212 provided with the signal produced by a local oscillator 214. The resultant N RF signals (e.g., $RF_{1, 2, \ldots, N}$) are then each connected to a selected subset of N transmit antenna elements by a switch 218. The switch 218 connects N RF signals (e.g., $RF_{1, 2, \ldots, N}$) to a set of N transmit antennas from the MT available transmit antennas 240, thereby yielding a set of N output signals. A corresponding set of N amplifiers 234 then amplify these N output signals, with the amplified output signals then being transmitted using the N selected transmit antennas 240. In another example, the amplifiers 234 may be located before the switch 218. In this configuration, a total of only N amplifiers is needed instead of a total of MT if one amplifier is placed at each of the MT antennas. The selection of the N antennas is generated so as to minimize the BER of the output signal at the receiver.

Figure 2B:
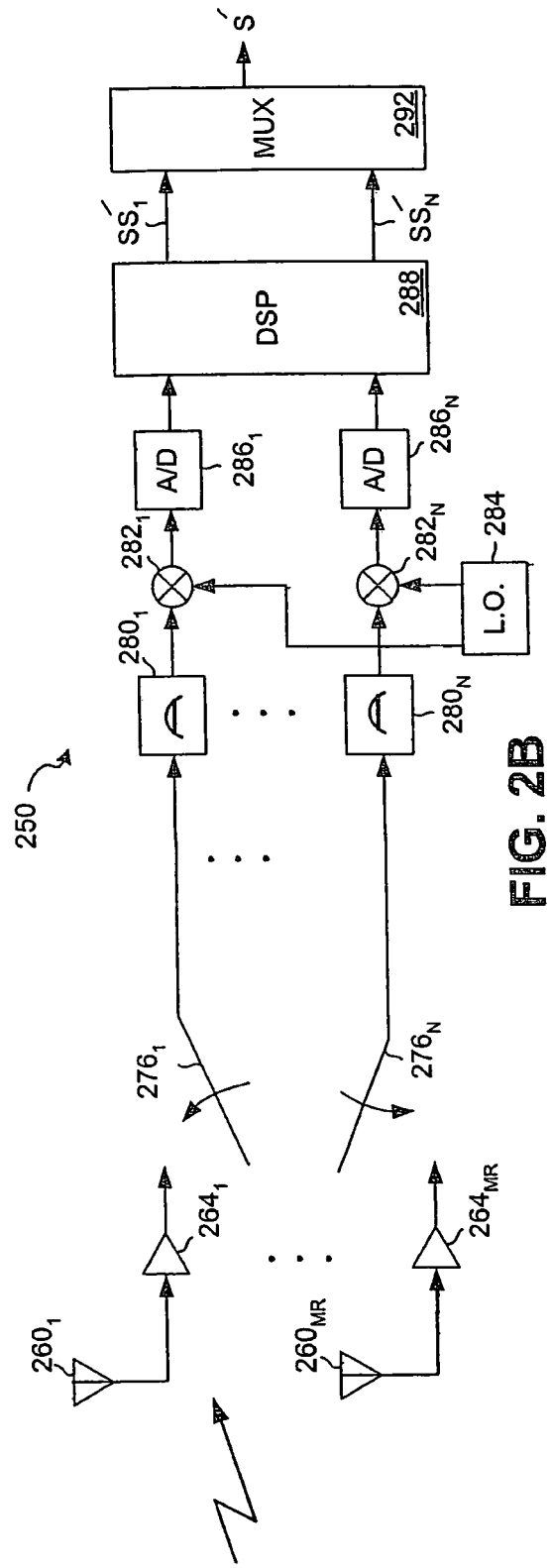

Referring to FIG. 2B, the N RF signals transmitted by the transmitter 210 are received by the set of MR receive antennas 260 deployed at the receiver 250. Each of the MR received signals is amplified by a respective low noise amplifier (LNA) 264 and then a subset N of them is connected to a set of N RF chains by a switch 276 in order to form a set of N RF signals which are passed through a corresponding set of N filters 280. In another example, the low noise amplifier 264 may be located after the switch 276 such that the total number of used LNA is N instead of MR if one LNA is placed at all MR receive antenna elements. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. (In fact, any of the embodiments according to some aspects of the present invention may incorporate, for example, homodyne configurations or heterodyne configurations). The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2, \ldots, N}$, which are the estimates of the N independent substreams $SS_{1, 2, \ldots, N}$. The N output signals $SS'_{1, 2, \ldots, N}$ are then multiplexed via a multiplexer 292 in order to generate the output signal S', which is an estimate of the input signal S.

In some embodiments according to some aspects of the present invention, a baseband weighting and combining (e.g., a "preceding") arrangement may be added at the transmitter side for use in conjunction with the antenna selection method discussed below. In this case a DSP block is placed between the demultiplexer 202 and the D/A converters 206, such that the N independent substreams $SS_{1, 2, \ldots, N}$ are weighted by complex coefficients and combined to form a set of N output signals. These N output signals are then converted into analog signals $AS_{1, 2, \ldots, N}$ using the corresponding set of D/A converters 206.

In some embodiments according to some aspects of the present invention, space-time coding can be added at the transmitter side for use in conjunction with an exemplary antenna selection method. In this case, the demultiplexer 202 is replaced by a DSP block which processes the input signal S over the space and time domain to form a set of N output signals. These N output signals are then converted into analog signals $AS_{1, 2, \ldots, N}$ using the corresponding set of D/A converters 206. Among the two most commonly used space-time techniques are 1) the insertion of a time delay (or equivalently a phase-shift) on one or more of the N output signals and 2) the use of the transmit diversity technique described in, for example, "A simple transmit diversity technique for wireless communications", by S. M. Alamouti, IEEE Journal on Selected Areas in Communications, vol. 16, issue 8, October 1998, pages 1451-1458, which is hereby incorporated herein by reference in its entirety.

Space-time coding techniques may be applicable, for example, to the SC MIMO systems and/or systems designed to yield diversity gain. Precoding techniques may be applicable, for example, to SC-based or spatial-multiplexing-based MIMO systems or systems designed to yield both data rate and diversity gains.

III. Antenna Selection Method at RF Based on Minimum Bit Error Rate

A. Overview

Some embodiments according to some aspects of the present invention relate, for example, to an antenna selection method in a multi-antenna communication system predicated upon minimizing a bit error rate. In some embodiments according to some aspects of the present invention, a subset of antenna elements is selected to transmit and/or receive the signals such that the bit error rate is minimized, for example, in a communication system with multiple antennas. Some embodiments according to some aspects of the present invention may be used for antenna selection at the transmitter when multiple antennas are used for transmission. Some embodiments according to some aspects of the present invention can be used for antenna selection at the receiver when multiple antennas are used for reception.

Some embodiments according to some aspects of the present invention may be applicable to, for example, (i) receivers using multiple antennas in what are referred to herein as single channel systems (e.g., system lacking spatial multiplexing); (ii) transmitters using multiple antennas in single channel systems; and (iii) systems in which a smaller number of RF chains are used at the transmitter and/or receiver than the number of transmit and/or receiver antennas in a MIMO system with spatial multiplexing or single-channel.

Some embodiments according to some aspects of the present invention will be described hereinafter with reference to FIGS. 3-7 within the following exemplary contexts: 1) a MIMO system with spatial multiplexing in which a smaller number of RF chains are used at the transmitter and receiver than the number of transmitter/receiver antennas; 2) a single-channel MIMO system without spatial multiplexing in which a smaller number of RF chains are used at the transmitter and receiver than the number of transmitter/receiver antennas; and 3) a single-channel SIMO system without spatial multiplexing containing a receiver using multiple antenna elements. Some embodiments according to some aspects of the present invention may also be employed in the case of a single-channel (SC) multiple-input-single-output (MISO) system without spatial multiplexing in which a transmitter utilizes multiple antenna elements.

For illustrative purposes, the following exemplary examples are described with reference to systems utilizing OFDM modulation (e.g., following the 802.1-1a WLAN standard) or to systems based upon a direct sequence spread spectrum (DS-SS) (e.g., following the WCDMA standard). In certain embodiments according to some aspects of the present invention, the processing capabilities of the DS-SS receiver may be extended to cover the spatial domain through incorporation of a space-time Rake receiver operative to combine multi-path "taps" corresponding to both the temporal and spatial domains. This extension illustrates that the techniques described herein may be generalized to virtually any system employing, for example, temporal and/or frequency domain processing in a frequency-selective fading environment.

B. Antenna Selection in a SM-MIMO-OFDM System

Figure 3:
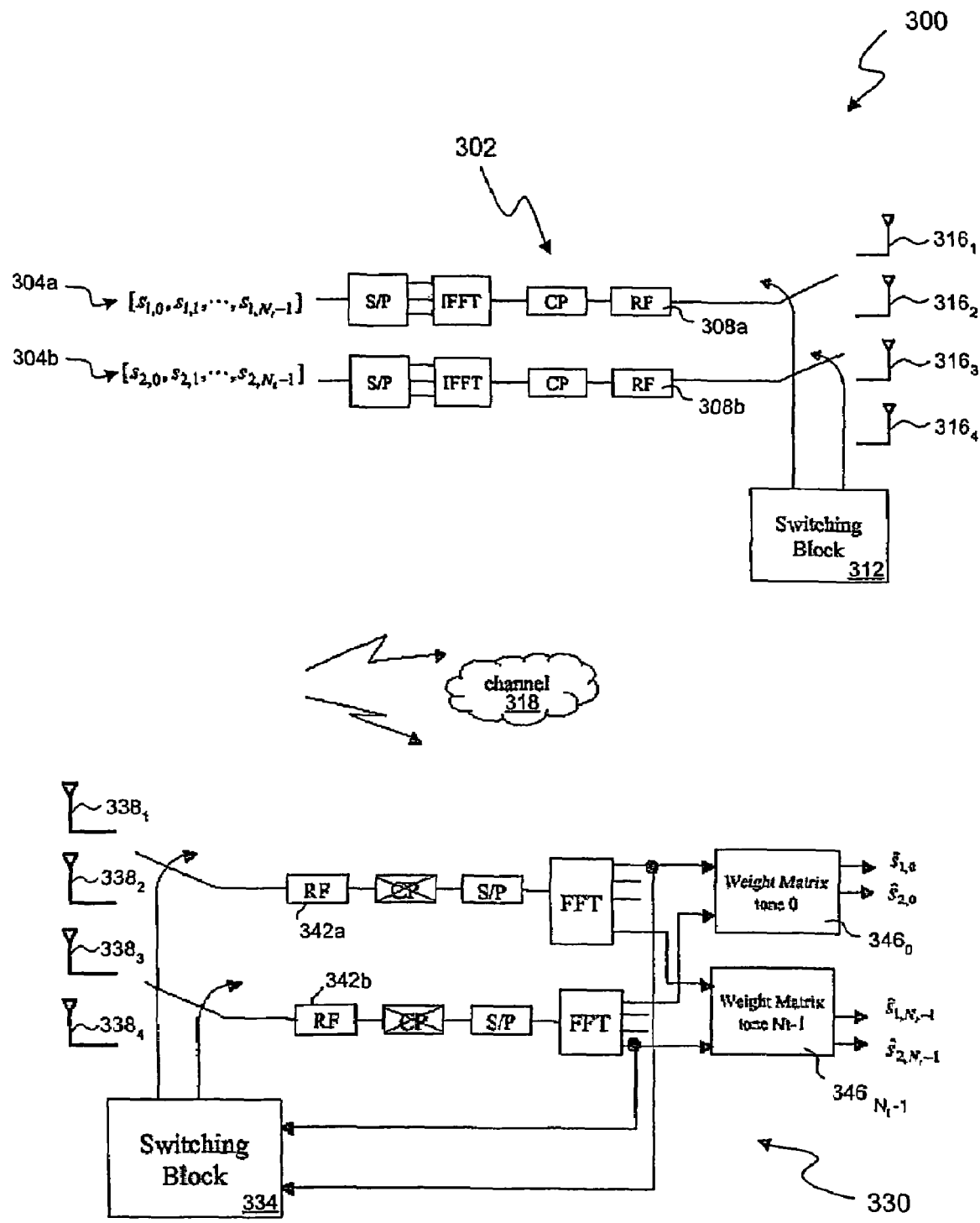
FIG. 3 shows an embodiment of an SM-MIMOOFDM system according to some aspects of the present invention.

FIG. 3 illustratively represents the transmitter and receiver structure of an SM-MIMO-OFDM system 300 utilizing antenna selection in accordance with an embodiment according to some aspects of the present invention. As shown, two independent sub-streams 304 (e.g., spatially-multiplexed signals) are OFDM-modulated onto $N_t$ frequency sub-carriers and passed through two RF chains 308 to prepare for transmission. At this point, a switching block 312 selects two of four transmit antenna elements 316 to connect to the two RF chains 308. Since only two out of four elements 316 are selected within the transmitter 302, the number of transmit RF chains is advantageously reduced to the number of spatially-multiplexed signals.

In the embodiment of FIG. 3, the switching block 312 contains information identifying the pair of antenna elements 316 to be used for transmission at any given time. The block 312 may compute this information itself (e.g., in the case where the channel 318 is reciprocal) in accordance with an algorithm based upon the minimum BER criterion. In another example, the block 312 may receive the information from the receiver 330 via a feedback path (not shown). This latter approach may be used in the case where the channel 318 is not reciprocal, for example, in an interference-limited environment.

Within the receiver 330, a switching block 334 selects two of four antenna elements 338 to receive incident signals transmitted by the transmitter 302. The switching block 334 connects the two selected antennas 338 to two RF chains 342 operative to convert the two signals into the digital domain for baseband processing. Then, a weight matrix 346 is applied to the received signals at each tone to separate and recover each one of the transmitted spatially-multiplexed signals.

In typical implementations the switching block 334 will be configured to itself compute which pair of antenna elements 338 should be selected for reception by executing an algorithm based upon the minimum BER criterion. In the case where the channel is not reciprocal, the block 334 may be further configured to compute which pair of antenna elements 316 should be used in the transmitter 302 and to provide this information to it. A description of two possible implementations of an antenna selection algorithm executable by the switching blocks 312, 334 is provided with reference to FIGS. 4A and 4B.

Figure 4A:
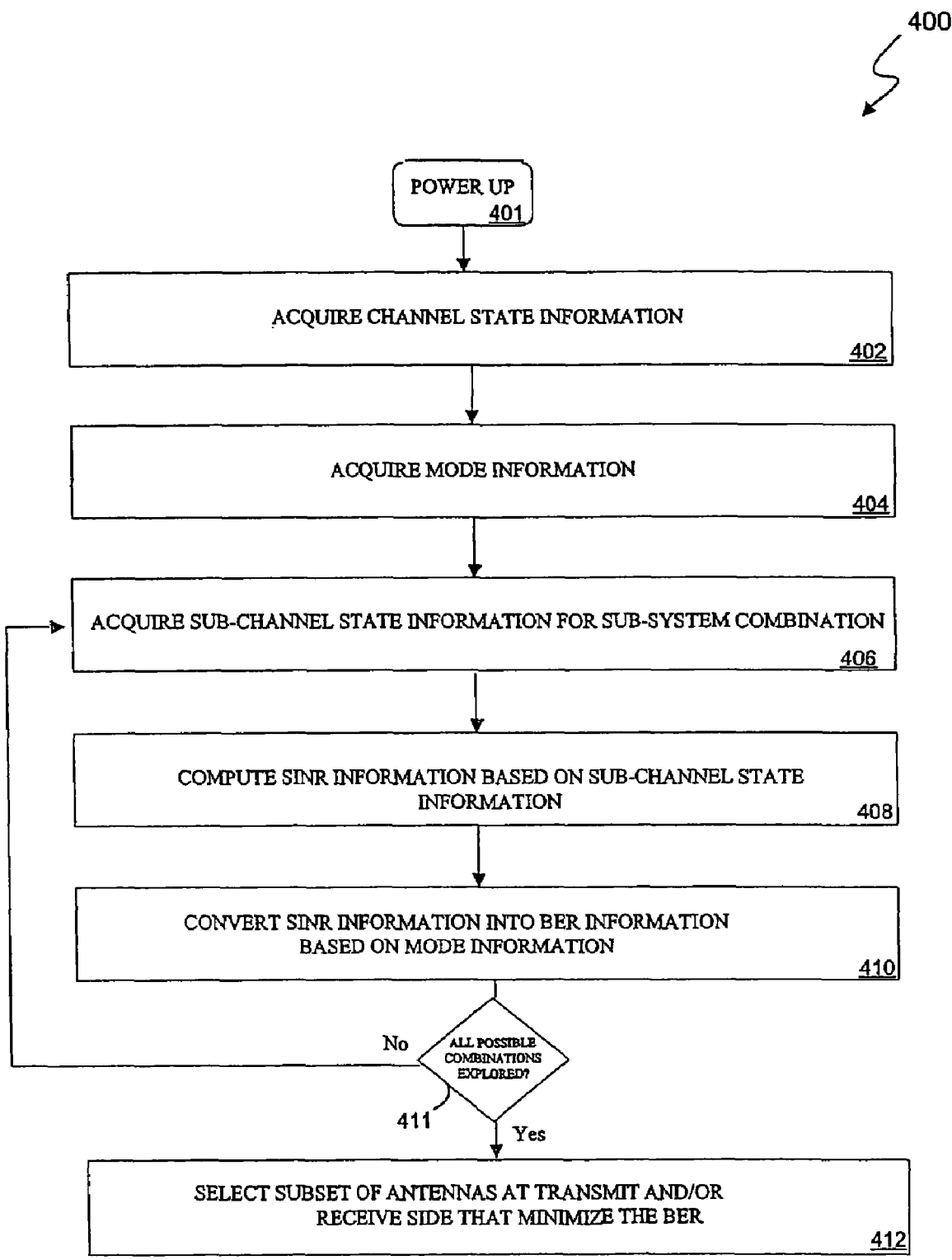
FIGS. 4A-B show flowcharts illustrating embodiments of an antenna selection method according to some aspects of the present invention.

Turning now to FIG. 4A, a flowchart is provided of an antenna selection algorithm 400 in which the coding/modulation mode (e.g., data rate or throughput) is fixed or adapted on a long-term basis (e.g., adapted to the large-scale variations of the SNR). The task of the selection algorithm is to select which pair of antenna elements 316 should be used at the transmitter 302 and which pair of antenna elements 338 should be used at the receiver 330 with respect to each packet for the given mode. The selection process may assume, for example, that the channel 318 is quasi-stationary (e.g., the channel 318 is constant over the duration of the packet being transmitted and changes independently between two contiguous packets). Even though the channel 318 may exhibit some frequency selectivity, the antenna selection may be common to the entire frequency bandwidth.

Referring to FIG. 4A, when the transmitter 302 initially powers up (step 401) and the state of the channel 318 is still unknown, a default subset of two of the antenna elements 316 is used to transmit the wireless signal. The receiver 330 similarly uses a default subset of two of the receive antenna elements 338 in order to acquire synchronization. Next, channel state information (CSI) is acquired (step 402). In some embodiments according to some aspects of the present invention, operations to acquire CSI are carried out at the receiver 330. A training sequence composed of known symbols is sent from the transmitter 302 to the receiver 330. At the receiver 330, the channel 318 is estimated based on the received signal and the known sequence of symbols. This operation is carried out as often as the channel 318 changes, for example, at each packet realization. In order for the selection method to be performed successfully, the complete channel matrix should be estimated over the whole frequency bandwidth (e.g., the estimation of the channel path gain from all antenna elements 316 of the transmitter 302 to all antenna elements 338 of the receiver across all tones). Channel estimation techniques based on training sequences applicable to MIMO systems are described in, for example, J. J. Van de Beek et al., "On Channel Estimation in OFDM Systems", *IEEE 45th Vehicular Technology Conference*, vol. 2, 25-28 July 1995, pp. 815-819 and A. N. Mody and G. L. Stuber, "Synchronization for MIMO OFDM Systems", *IEEE Globecom* 2001, vol. 1, pp. 509-513, which are hereby incorporated herein by reference in their entirety.

Referring again to FIG. 4, mode information is acquired through execution of a link adaptation algorithm (step 404). In the embodiment illustrated by FIG. 4A, the mode change may occur slowly. This enables a link adaptation algorithm to be employed to decide which of the possible mode candidates is best suited to be used in view of the long-term average SNR. Employment of a link adaptation algorithm may ensure that, given a mode selection criterion (e.g., a maximum data rate and a minimum transmit power), the most efficient mode is always used in view of long-term varying channel/SNR conditions. An exemplary link adaptation algorithm capable of being utilized within frequency-selective MIMO systems is described, for example, in "Adaptive Modulation and MIMO Coding for Broadband Wireless Data Networks", by S. Catreux et al., *IEEE Communications Magazine*, vol. 40, No. 6, June 2002, pp. 108-115, which is incorporated herein by reference in its entirety. The mode selection may generally be independent of the method of selecting transmitter/receiver antenna elements. The mode may be selected based exclusively upon long-term SNR statistics. Accordingly, it changes at a much slower rate than that at which the antennas are selected. In other words, the selection algorithm may select a new subset of antennas with respect to each packet realization, while the mode changes as a function of long-term SNR variations.

Steps 406, 408 and 410 are repeatedly executed in a loop until all possible combinations of subsets of transmit/receive antenna elements have been evaluated (step 411). For example, considering a MIMO-OFDM system of the type depicted in FIG. 3 (e.g., equipped with 4 transmit antenna elements 316 and 4 receive antenna elements 338), the complete channel matrix can be represented in the frequency domain at tone k by a 4×4 matrix denoted by $H_k$. After selection of a subset of two antennas at each side, the subchannel matrix is reduced in size to a 2×2 matrix denoted by $\tilde{H}_k$. There are $$\binom{4}{2} = 6$$

possibilities in selecting 2 elements out of a total of 4. Since the antenna selection is applied at both the transmitter 302 and receiver 330, the total number of combinations possible for $H_k$ is equal to 36. In the general case of a M×M MIMO system being reduced in size to a n×n MIMO system (where M>n), there are $$\binom{M}{n} = \frac{M!}{n!(M-n)!}$$

possibilities in selecting n antenna element from M possible elements. When the selection occurs at both a transmitter and receiver, the total number of combinations for $H_k$ is equal to $$\left(\frac{M!}{n!(M-n)!}\right)^2.$$

This corresponds to the number of iterations of the loop comprised of steps 406, 408 and 410. These iterations may be performed in series (e.g., reusing, common processing resources) or in parallel (e.g., at the expense of additional processing resources). In an exemplary example, all possible antenna combinations could be contemporaneously processed, which might employ a separate processing resource for each possible antenna combination.

Each iteration in the loop comprised of steps 406, 408 and 410 affects processing of one antenna subsystem. First, the 2×2 matrix $\tilde{H}_k$ is acquired across all tones (k=1, . . . , $N_t$) for the subsystem of interest (Step 406). The post-processing signal-to-interference-and-noise ratio (SINR) is then computed at each tone k and for each transmitted spatially-multiplexed signal (Step 408). The SINR can most often be found by a closed-form solution dependent upon which signal processing technique is used at the transmitter 302 and/or receiver 330 (e.g., Maximum Ratio Combining (MRC), Minimum Mean Square Error (MMSE), eigen-beamforming, and Maximum Likelihood (ML)). For example, if no spatial processing is implemented at the transmitter 302 and MMSE is applied at the receiver 330, the SINR may be determined as follows:

Compute $$B_k = \tilde{H}_k^H \tilde{H}_k + \frac{\sigma^2}{\sigma_s^2} I_2$$

with $$I_2 = \begin{bmatrix} 1 & 0 \\ 0 & 1 \end{bmatrix},$$

$\sigma^2$ and $\sigma_s^2$ stand for noise and signal power respectively and k=1, . . . , $N_t$ (step 408-1).

Compute $C_k=1/\text{diag}(B_k^{-1})$ this is a N×1 vector for each k=1, . . . , $N_t$ (step 408-2).

Compute $$SINR_K = \frac{\sigma_s^2}{\sigma^2} C_k - 1$$

this is a N×1 vector for each k=1, . . . , $N_t$ (step 408-3).

In step 410, the SINR information is converted into BER information in view of the current mode (see, e.g., step 404). Since the BER may be a complicated function of the channel 318 and of the coding/modulation and antenna combining techniques used, an approximation of the BER may be used. The approximation may also be a function of the channel 318 and of the applicable coding/modulation and antenna combining techniques. The BER over the packet (e.g., at the output of the Viterbi decoder if coding is used) for transmitted substream i may be expressed as a non-linear, unknown function $f$ of the set of $SINR_k$, $k=1, \ldots, N_t$, for example:

$$\overline{BER}_i = f(\{SINR_k^i\}), i=1,\ldots,N; k=1,\ldots,N_t$$

Next, the function $f$ is approximated by some known function. Specifically, the output BER is approximated by the average of the bit error rate over the channel, for example:

$$\overline{BER}_i \approx 1/N_t \sum_{k=1}^{N_t} BER_k^i \quad (1.)$$

where $BER_k^i$ is the bit error rate given the SINR at tone k for spatially-multiplexed substream i. In another example, $BER_k$ can also be the bit error rate given the signal-to-noise ratio at tone k. The average may also be taken in the time domain where $BER_k$ is the bit error rate given the SINR at channel time sample k. $BER_k$ may be the bit error rate with respect to a given signal component (e.g., a signal tone or tap delay).

Furthermore, $BER_k$ is also approximated by some simple closed-form function. Through simulations it has been found that for mode 1 of 802.1-1a (e.g., BPSK, R1/2), the behavior of the average bit error rate $\overline{BER}$ with respect to the SINR or SNR (in some examples, the BER normalization factor $1/N_t$ may be omitted, since it does not affect the antenna selection) can be modeled, for example, by:

$$\overline{BER}_i \approx -\sum_{k=1}^{N_t} \tanh(SINR_k^i); i=1,\ldots,N \quad (2.)$$

The BER at signal component k has been approximated by $-\tan h (SINR_k)$.

The tan h function may not always adequately approximate the BER, particularly for different modulation techniques. Some of the following functions may generally afford better approximations when using particular techniques:

1) The BER of an uncoded BPSK modulation in AWGN channel is (see, e.g., J. G. Proakis, *Digital Communications*, 3$^{rd}$ Ed. McGraw-Hill Series, 1995)

$$BER_{BPSK} = Q\left(\sqrt{\frac{2E_b}{N_o}}\right) = Q(\sqrt{2\gamma_b}) = \frac{1}{2}\text{erfc}(\sqrt{\gamma_b}) = \frac{1}{2}\text{erfc}(\sqrt{\gamma_s})$$

The shape of the function erfc is reasonably approximated by the function (as compared to $y=-\tan h(x)$)

$$y = -[(1-e^{-2\sqrt{x}}) + (1-e^{-1.8x})]$$

2) The BER of an uncoded QPSK modulation in AWGN channel is (see, e.g., J. G. Proakis, *Digital Communications*, 3$^{rd}$ Ed. McGraw-Hill Series, 1995)

$$BER_{QPSK} = Q\left(\sqrt{\frac{2E_b}{N_o}}\right) = Q(\sqrt{2\gamma_b}) = \frac{1}{2}\text{erfc}(\sqrt{\gamma_b}) = \frac{1}{2}\text{erfc}\left(\sqrt{\frac{\gamma_s}{2}}\right)$$

The shape of erfc($\sqrt{x/2}$) is better approximated by the function:

$$y = -[(1-e^{-1.3\sqrt{x}}) + (1-e^{-x})]$$

than by $y=-\tan h(x)$.

3) The BER of an uncoded 16QAM modulation in AWGN channel may be derived from the symbol error rate (SER) given, for example, in J. G. Proakis, *Digital Communications*, 3$^{rd}$ Ed. McGraw-Hill Series, 1995 as $$BER_{16QAM} = 1 - \sqrt{1 - \frac{3}{2}Q\left(\sqrt{\frac{3E_s}{15N_o}}\right)} = 1 - \sqrt{1 - \frac{3}{4}\text{erfc}\left(\frac{\gamma_s}{10}\right)}$$

An appropriate fitting function is $y=-(1-e^{-0.2x})$.

4) The BER of an uncoded 64QAM modulation in AWGN channel may be derived from the symbol error rate (SER) given, for example, in J. G. Proakis, *Digital Communications*, 3$^{rd}$ Ed. McGraw-Hill Series, 1995 as $$BER_{64QAM} = 1 - \left(1 - \frac{7}{4}Q\left(\sqrt{\frac{\gamma_s}{21}}\right)\right)^{\frac{1}{3}} = 1 - \left(1 - \frac{7}{8}\text{erfc}\left(\sqrt{\frac{\gamma_s}{42}}\right)\right)^{\frac{1}{3}}$$

An appropriate fitting function is $y=-(1-e^{-0.35\sqrt{x}})$.

It is to be understood than any fitting function that reasonably models the behavior of the BER versus SINR can be used in equation (2). The number of appropriate fitting functions is not limited to the few examples given above.

As mentioned above, steps 406 to 410 are iteratively performed until all possible combinations of subsets of antennas are considered (step 411). At the conclusion of this iterative process, a set of N estimates of BER values (one for each spatially-multiplexed signal) for all $$\frac{M!}{n!(M-n)!}$$

$$\left(\text{or } \left(\frac{M!}{n!(M-n)!}\right)^2\right)$$

possible antennas combinations is obtained. It then remains to select the subset of antennas that minimize the mean over the set of BERs, the maximum over the set of BERs or, the minimum of the set of BERs (step 412).

$$\min_{\substack{antennas \\ combinations}} \left\{ \underset{i=1,\ldots,N}{mean} \{BER_i\} \right\}$$

$$\min_{\substack{antennas \\ combinations}} \left\{ \min_{i=1,\ldots,N} \{BER_i\} \right\}$$

$$\min_{\substack{antennas \\ combinations}} \left\{ \max_{i=1,\ldots,N} \{BER_i\} \right\}$$

Figure 4B:
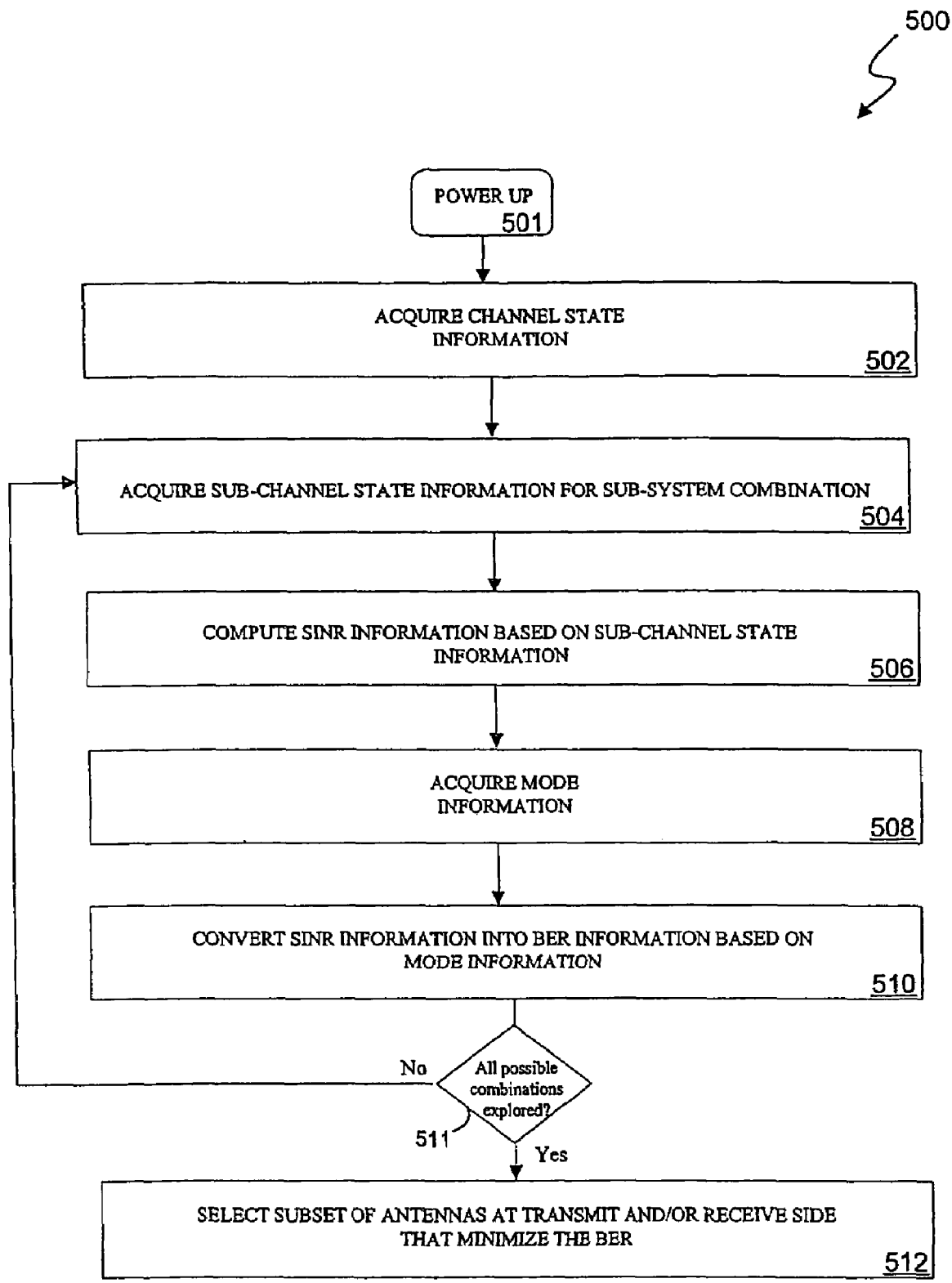

FIG. 4B is a flowchart of an antenna selection algorithm 500 in which the coding/modulation mode may be changed as frequently as once per packet realization in response to corresponding changes in the channel 318. In this example, the coding/modulation mode is adapted at the same rate as antenna selection is effected.

Referring to FIG. 4B, steps 501 and 502 are similar to steps 401 and 402, respectively. As shown, steps 504 through 510 comprise a loop that is iteratively executed until all possible combinations of subsets of antennas have been evaluated. It follows that the number of iterations of this loop is equivalent to $$\frac{M!}{n!(M-n)!}$$

(e.g., selection at one end of the link) or $$\left(\frac{M!}{n!(M-n)!}\right)^2$$

(e.g., selection at both ends of the link). In this regard steps 504 and 506 are similar to steps 406 and 408, respectively. Based upon the knowledge of the instantaneous SINR at all tones, a link adaptation block determines the most efficient mode for each spatially-multiplexed signal, given a mode selection criterion (e.g., a maximum data rate and a minimum transmit power) (step 508). This step is similar to step 404, with the exception that the mode decision is made based upon instantaneous SNR (or SINR) statistics rather than upon long-term SNR (or SINR) statistics. As a result, different combinations of subsets of antennas may yield different mode decisions. Finally, given the instantaneous SINR and mode information, step 510 computes or determines the corresponding BER in the same manner as was described above with reference to step 410.

Again, steps 504 through 510 are performed until all possible combinations of subsets of antennas are considered (step 511). Once this has occurred, a set of N estimates of BER values (e.g., one for each spatially-multiplexed signal) for all $$\frac{M!}{n!(M-n)!} \text{ (or } \left(\frac{M!}{n!(M-n)!}\right)^2\text{)}$$

possible antennas combinations is obtained. The selection algorithm 500 differs from the algorithm 400 in that the $$\frac{M!}{n!(M-n)!} \text{ (or } \left(\frac{M!}{n!(M-n)!}\right)^2\text{)}$$

possible antennas combinations do not necessarily use the same coding/modulation mode. The decision of which antennas subset to select therefore depends not only on a minimization of the BER but also on the mode (e.g., data rate or throughput). Several exemplary options are provided with regard to the final decision of selecting a subset of antenna elements pursuant to step 512 of the selection algorithm 500:

Option 1
1) Group all combinations of subsets of antennas using the same mode into a common pool.
2) Choose the pool corresponding to the highest mode (yielding maximum data rate).
3) Within that pool, select the combination of subset of antennas that minimizes the BER in a manner substantially similar to that described with reference to Step 412.

Option 2
Regardless of which mode is used by each combination, select the combination of antenna subsets that minimizes the BER in a manner substantially similar to that described with reference to Step 412.

Option 3
Implement a hybrid version of option 1 and 2, for example:
1) Group all combinations of subsets of antennas using the same mode into a common pool.
2) Choose the X pools corresponding to the X highest modes (yielding maximum data rate), where X is an integer equal to 1, or 2 or 3, etc.
3) Within these pools, select the combination of subset of antennas that minimizes the BER in a manner substantially similar to that described with reference to step 412.

Figure 5:
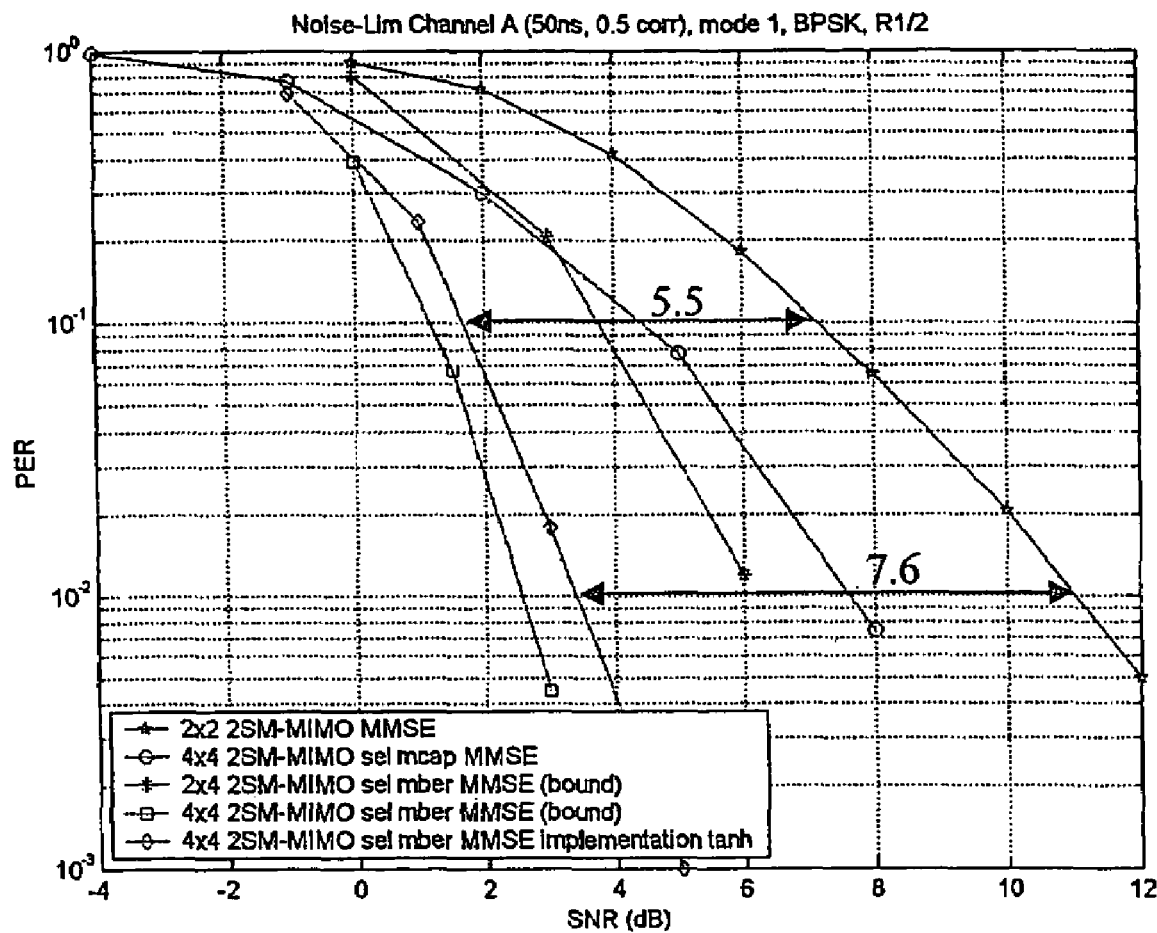
FIG. 5 shows a graph illustrating exemplary performance results according to some aspects of the present invention.

FIG. 5 illustratively represents the packet error rate (PER) as function of SNR resulting from employment of an exemplary antenna selection technique within a SM-MIMO-OFDM system operative in a noise-limited environment. The results of FIG. 5 may be applicable, for example, to a system using four transmit and receive antennas in the manner exemplified by FIG. 3. The results reflect, as merely exemplary examples, a packet size of 1000 bytes and a fixed coding/modulation mode. The results also reflect that two exemplary RF chains are incorporated within both the applicable transmitter and receiver. In addition, the results of FIG. 5 use BPSK modulation, a coding rate of 1/2 (e.g., mode 1 of 802.11a), a channel model characterized as "channel A" (e.g., 50 ns rms delay spread, 0.5 antenna correlation), and a fitting function of tan h.

The legend for the curves in FIG. 5 is as follows:

2×2 2SM-MIMO MMSE: This system corresponds to a SM-MIMO-OFDM system using 2 transmit and 2 receive antennas together with 2 spatially-multiplexed (SM) signals. Since the number of antennas is equal to the number of SM signals, no antenna selection is applied. A baseband combining arrangement is used at the receiver to separate the two substreams, e.g., MMSE.

4×4 2SM-MIMO sel mcap MMSE: This system corresponds to a SM-MIMO-OFDM system using 4 transmit and 4 receive antenna elements together with 2 spatially-multiplexed (SM) signals. A conventional selection method is applied at both the transmitter and receiver to select a subset of 2 antenna elements among four, according to a maximum capacity criterion. After the selection at the receiver, MMSE is applied at baseband to separate the two substreams.

2×4 2SM-MIMO sel mber MMSE (bound): This system corresponds to a SM-MIMO-OFDM system using 2 transmit and 4 receive antenna elements together with 2 spatially-multiplexed (SM) signals. A selection method is applied only at the receiver end to select a subset of 2 antenna elements among four, according to the minimum BER criterion. In this case, no fitting function is used to approximate the BER. Instead, the BER is assumed to be known perfectly. This case may not be readily implemented, but rather provides a bound on the performance which may be achieved through use of some embodiments according to some aspects of the present invention.

4×4 2SM-MIMO sel mber MMSE (bound) This system corresponds to a SM-MIMO-OFDM system using 4 transmit and 4 receive antenna elements together with 2 spatially-multiplexed (SM) signals. A selection method is applied at both transmit and receive sides to select a subset of 2 antenna elements among four, according to the minimum BER criterion. In this case, no fitting function is used to approximate the BER. Instead, the BER is assumed to be known perfectly. This case may not be readily implemented, but rather provides a bound on the performance which may be achieved through use of some embodiments according to some aspects of the present invention.

4×4 2SM-MIMO sel mber MMSE (implementation tan h) This system corresponds to a SMMIMO-OFDM system using 4 transmit and 4 receive antenna elements together with 2 spatially-multiplexed (SM) signals. A selection method according to some embodiments according of the present invention is applied at both transmit and receive sides to select a subset of 2 antenna elements among four, according to a minimum BER criterion. The fitting function to approximate the BER is tan h.

The results illustratively represented by FIG. 5 show that all systems using some type of antenna selection provide gains relative to systems with no selection, and that antenna selection based upon minimum BER provides significantly more gain than selection based upon the maximum capacity criterion. Specifically, at a PER level of 10e-2 and with antenna selection in accordance with the present invention being applied at both the transmitter and receiver, a 7.6 dB gain is achieved relative to a system with no selection and 4.2 dB gain is demonstrated relative to a system in which selection is based on maximum capacity. When selection is applied consistent with some embodiments according to some aspects of the present invention at only the receiver, the resulting performance is seen to be between that achieved when no selection is employed and that which occurs when selection is employed at both the transmitter and receiver. Finally, the performance of the system in accordance with some embodiments according to some aspects of the present invention very closely approaches a theoretical performance bound illustrated by FIG. 5.

C. Antenna Selection in a SC-MIMO-OFDM System

Figure 6:
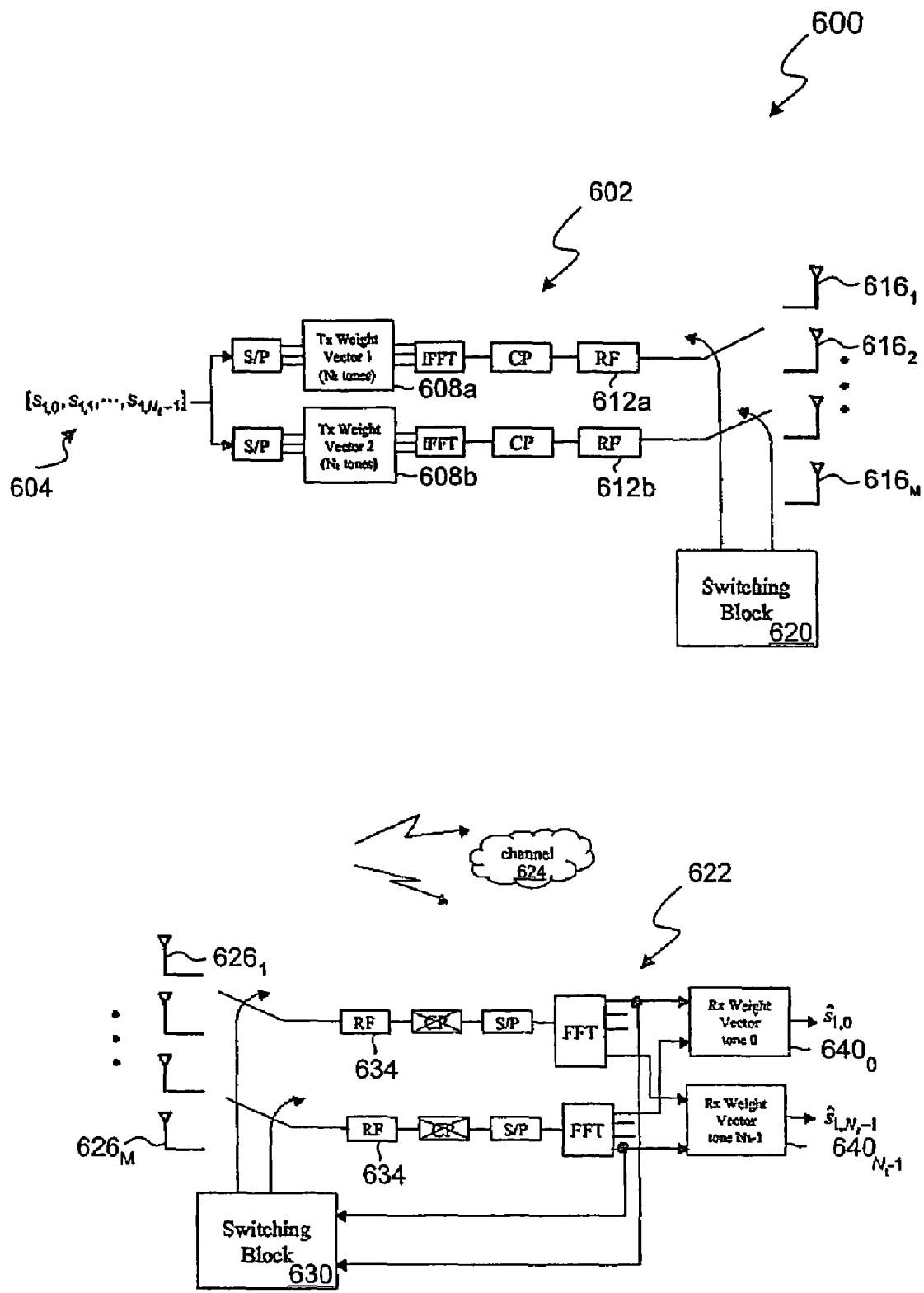
FIG. 6 shows an embodiment of an SC-MIMO-OFDM system according to some aspects of the present invention.

FIG. 6 illustrates a SC-MIMO-OFDM system 600 which utilizes precoding techniques in addition to an exemplary antenna selection method according to some embodiments of the present invention. In the embodiment of FIG. 6, precoding refers to various baseband weighting and combining arrangements performed at a transmitter 602. Referring to FIG. 6, a single-stream of symbols 604 is weighted by a set of complex coefficients 608 and combined to produce a set of N output signals where N refers to the number of RF chains 612 used within the transmitter 602. These N output signals are then passed through the N RF chains 612 in order to produce N RF signals. These N RF signals are then coupled to a corresponding group of N of M transmit antenna elements 616 via a switch 620 and transmitted through a channel 624.

At a receiver 622, a set of N of M receive antenna elements 626 is selected via a switch 630 to receive the incoming signals communicated through a channel 624. The N RF receive signals are then processed by N RF chains 634 and converted to the digital domain for baseband processing to recover the original transmitted signal.

Some embodiments according to some aspects of the present invention may provide, for example, that the baseband weights 608 and antenna selection method are designed to collectively contribute to the minimization of the BER. Some embodiments according to some aspects of the present invention may provide, for example, that the baseband weights 608 may be chosen to maximize the output SNR (or SINR) or capacity, while the antenna selection is conducted so as to minimize the BER. The right and left singular vectors of the sub-channel matrix $H_k$ corresponding to the largest singular value may be used to select optimal subsets of transmit antenna elements 616 and receive antenna elements 626 as well as the appropriate transmit baseband weights 608 and receive baseband weights 640. Determination of baseband weighting values in the context of MIMO systems lacking antenna selection has been described, for example, in J. B. Andersen, IEEE Antennas and Propagation Magazine, vol. 42, no. 2, April 2000, pp. 12-16, which is incorporated herein by reference in its entirety.

The exemplary embodiment illustrated in FIG. 6 may be modified by replacing the baseband weights 608 within the transmitter 602 by a space-time coding block. In this case, an antenna selection method may be employed to select the subset of antennas in both the transmitter and receiver in accordance with some embodiments of the present invention. In addition, the space-time coding block processes the input stream of symbols as described in, for example, "A simple transmit diversity technique for wireless communications", by S. M. Alamouti, IEEE Journal on Selected Areas in Communications, vol. 16, issue 8, October 1998, pages 1451-1458, which is incorporated herein by reference in its entirety.

D. Antenna Selection in a DS-SS-SIMO System

Figure 7:
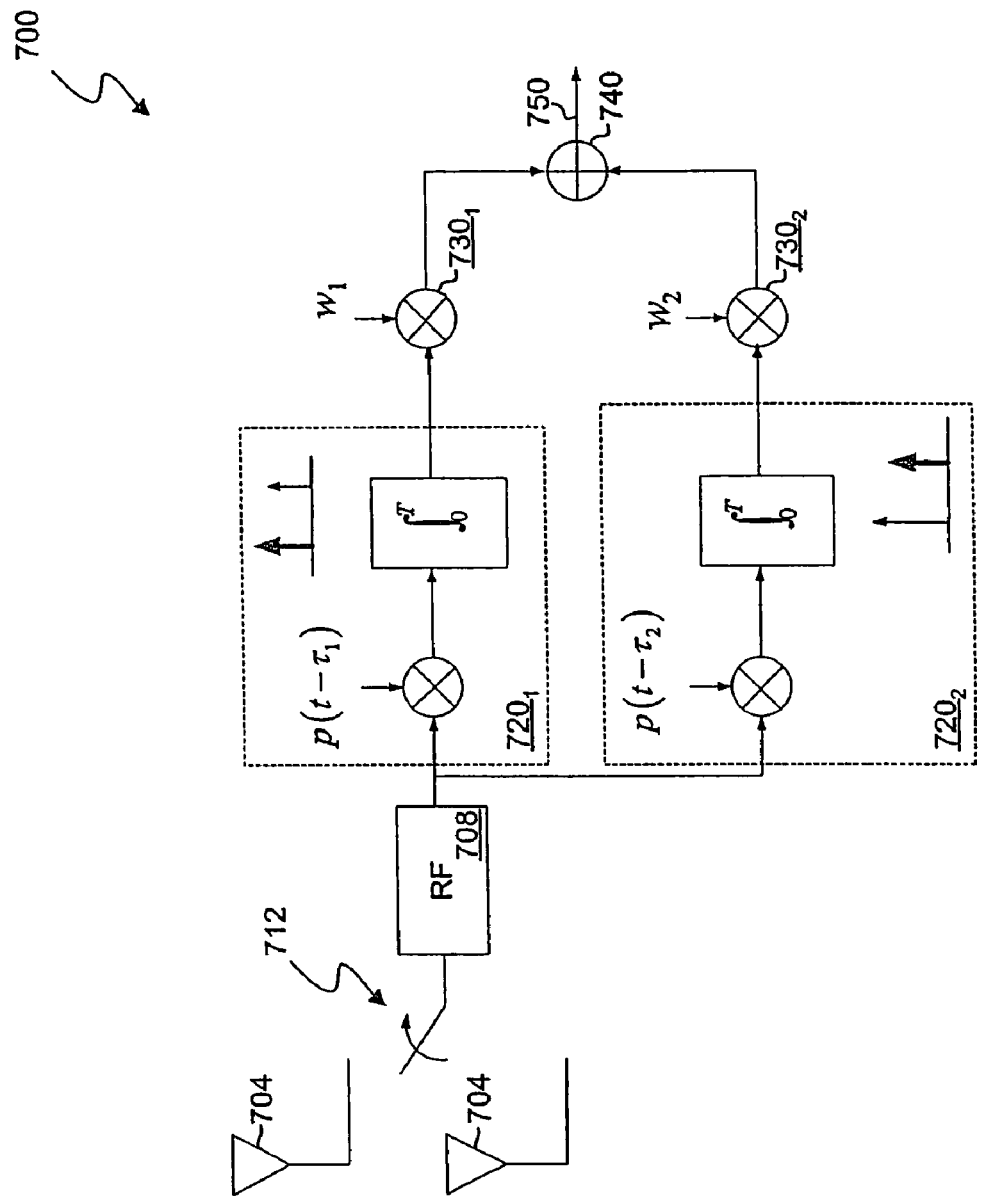
FIG. 7 shows an embodiment of a receiver in a DS-SS SIMO system according to some aspects of the present invention.

FIG. 7 depicts a receiver 700 of a DS-SS SIMO system having two receive antenna elements 704 ($n_R$=2). The receiver 700 integrates RAKE receiver functionality together with an exemplary antenna selection process. As shown, the receiver 700 is equipped with only a single RF chain 708 disposed to be connected to only one of the two receive antenna elements 704 at any given time via a switch 712. The choice of which of the two elements 704 to connect to the RF chain 708 is made based upon the minimum BER criterion. Some embodiments according to some aspects of the present invention may provide that the received signal BER corresponding to each receive antenna element 704 is computed and the element 704 yielding the minimum value of BER is selected. Since the BER may typically comprise a complicated function of the applicable channel and of the coding/modulation and antenna combining techniques used, the BER for a given channel and antenna combining technique is approximated such that it varies as a function of the coding/modulation method used.

Once the optimal one of the antenna elements 704 has been selected, the RAKE receiver behaves in the same way as if it were implemented in a single-input single-output (SISO) system (e.g., one antenna at each end of the link). The RAKE receiver uses a plurality of J correlators 720 (e.g., J=2 in FIG. 7), each of which corresponds to one of the first J separable multipath components. Each such multipath component is associated with a time delay $\tau_j$, j=1, ... ,J, respectively. The output of each correlator 720 (e.g., a finger) is then weighted 730 and combined 740 to form a single output received signal 750 comprising an estimate of the transmitted signal.

In one exemplary example, the received signal corresponding to the $i^{th}$ antenna element 704 at the input of the RAKE receiver may be expressed as:

$$r_i(t) = \sum_{l=1}^{L_i} h_{i,l}\sqrt{2P}\,d(t-\tau_{i,l})p(t-\tau_{i,l})\cos(w_0(t-\tau_{i,l})-\theta_{i,l}) + n_i(t) \quad (3.)$$

where $L_i$ is the number of taps in the channel received at the $i^{th}$ antenna element 704, $h_{i,l}$ is the complex channel gain at antenna i and tap l, P is the signal transmit power, d is the data sequence comprised of symbols of period T, and p is the spreading sequence composed of chips of period $T_c$=T/G, where G is the spreading factor. In addition, $\tau_{i,j}$ is the path delay associated with tap l and antenna i, $w_0$ corresponds to the carrier frequency $w_0$=$2\pi f_0$, and $\theta_{i,l}$ is the phase shift corresponding to tap l and antenna i. The noise $n_i$ measured at the $i^{th}$ antenna element 704 is modeled as an AWGN process with two-side spectral density $N_0/2$. For the sake of simplicity and clarity of expression, equation (3) assumes a single-user environment. However, the present invention need not be so limited and also contemplates being applied in the presence of multiple users.

At the output of the correlator 720 of the $j^{th}$ finger, the received signal may be represented as:

$$r_{i,j} = \sqrt{\frac{2}{T}} \int_{\tau_j}^{\tau_j} r_i(t)p(t-\tau_j)\cos(w_0(t-\tau_j)-\theta_j)dt = \sqrt{PT}\, h_{i,j}d_0 + n_{i,j} \quad (4.)$$

where $d_0$ is the desired symbol to be demodulated, and $n_{i,j}$ is the AWGN noise component with zero-mean and with two-side spectral density $N_0/2$. Again for purposes of simplicity and clarity of presentation, it was assumed in equation (4) that there is no interpath interference (IPI). However, the present invention also contemplates being used in the presence of IPI.

Following diversity combining, the final output of the RAKE receiver corresponding to the $i^{th}$ antenna element 704 is:

$$r_i = \sum_{j=1}^{J} w_{i,j} r_{i,j} \quad (5.)$$

where J is the number of RAKE fingers and where the optimum combining weights are generally chosen so as to match the channel, for example:

$$w_{i,j} = h^*_{i,j} \quad (6.)$$

In this case, the RAKE performs maximum ratio combining and the SNR at the RAKE output, corresponding the $i^{th}$ antenna element 704 is given by $$\gamma_i = \sum_{j=1}^{J} \gamma_{i,j} \quad (7.)$$

where $\gamma_{i,j}$ is the post-combining SNR on the $j^{th}$ path associated with the $i^{th}$ antenna element 704. Based on (4), $\gamma_{i,j}$ may be expressed by:

$$\gamma_{i,j} = \frac{|h_{i,j}|^2 P}{\sigma^2} \quad (8.)$$

where $$\sigma^2 = \frac{N_0}{2} \cdot \frac{2}{T}$$

is the noise power.

The BER at the output of the RAKE receiver corresponding to the $i^{th}$ antenna element 704 may be obtained from the knowledge of the probability density function (PDF) of $\gamma_i$. For example, if no coding is used and BPSK modulation is applied to the data sequence in accordance with the methodology described, for example, in "Digital Communications", J. G. Proakis, 3$^{rd}$ Edition, McGraw-Hill Series, 1995, the BER is found by integrating the conditional error probability represented by $Q(\sqrt{2\gamma_i})$ over the PDF of $\gamma_i$, for example:

$$BER_i = \int_0^\infty Q(\sqrt{2\gamma_i}) p_\gamma(\gamma_i) d\gamma_i \quad (9.)$$

Once the BER is estimated for all receive antennas, the antenna element 704 yielding the minimum BER is selected:

$$\min_{i=1,\ldots n_R} \{BER_i\} \quad (10.)$$

where $n_R$ represents the total number of receiver antenna elements.

As will be readily appreciated, as coding is added to the system (e.g., turbo coding, convolution coding) and other modulation levels are used, the modeling function used in (9) to estimate the BER will need to change. Some embodiments according to some aspects of the present invention may provide that any fitting function which accurately models BER behavior for a given system may be used by an exemplary antenna selection algorithm. The fitting function will generally be dependent upon parameters including, for example, one or more of the following: the channel, coding and modulation used, signal processing at transmit and/or receiver side, receiver SNR and other parameters.

The exemplary embodiment illustrated in FIG. 7 may be extended to a two-dimensional RAKE receiver in which processing is conducted in both the space and time domain. In this context, an exemplary antenna selection algorithm may be incorporated to select a subset of N antennas (N>1), from a total of M antennas (M>N), which minimize the BER at the output of the 2D-RAKE.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. In a receiver having one or more RF chains and a first plurality of receive antennas, a method for selecting a subset of the first plurality of receive antennas to receive a transmitted RF signal, the method comprising:

establishing a second plurality of possible subsets of the first plurality of receive antennas for each possible coding rate;

determining a maximum date rate among the second plurality of possible subsets of the first plurality of receive antennas for each coding rate;

selecting the coding rate with the highest maximum data rate;

determining a second plurality of output bit error rates of the receiver corresponding to the second plurality of possible subsets of the first plurality of receive antennas for the selected coding rate;

identifying a minimum of the second plurality of output bit error rates for the selected coding rate;

selecting one of the second plurality of possible subsets of the first plurality of receive antennas corresponding to the minimum of the second plurality of output bit error rates for the selected coding rate; and connecting the one or more RF chains to the receive antennas of the selected one of the second plurality of possible subsets.

2. The method according to claim 1, wherein the second plurality of output bit error rates are approximated by a closed-form expression.

3. The method according to claim 2, wherein the closed form expression is one of a) $y=-\tan h(x)$, b) $y=-[(1-e^{-2\sqrt{x}})+(1-e^{-1.8x})]$, c) $y=-[(1-e^{-1.3\sqrt{x}})+(1-e^{-x})]$, d) $y=-(1-e^{-0.2x})$, or e) $y=-(1-e^{-0.35\sqrt{x}})$.

4. The method according to claim 2, wherein the closed-form expression is dependent upon coding and/or modulation of the transmitted RF signal.

5. The method according to claim 2, wherein the closed-form expression is a function of an output signal to noise ratio or an output signal-to-noise-and interference ratio of the receiver.

6. The method according to claim 1, wherein the first plurality of receive antennas are greater in number than the one or more RF chains and wherein a size of each of the second plurality of possible subsets is equivalent to a number of the one or more RF chains.

7. The method according to claim 1, wherein the transmitted RF signal comprises at least one of: a code division multiple access signal, a single carrier signal, an orthogonal frequency division multiplexed signal and a UWB signal.

8. In a transmitter having one or more RF chains and a first plurality of transmit antennas, a method for selecting a subset of the first plurality of transmit antennas for transmission of an RF signal as a corresponding plurality of RF output signals subsequently received by a receiver, the method comprising:

establishing a second plurality of possible subsets of the first plurality of transmit antennas for each possible coding rate;

determining a maximum date rate among the second plurality of possible subsets of the first plurality of transmit antennas for each coding rate;

selecting the coding rate with the highest maximum data rate;

determining a second plurality of output bit error rates of the receiver corresponding to the second plurality of possible subsets of the first plurality of transmit antennas for the selected coding rate;

identifying a minimum of the second plurality of output bit error rates for the selected coding rate;

selecting one of the second plurality of possible subsets of the first plurality of transmit antennas corresponding to the minimum of the second plurality of output bit error rates for the selected coding rate; and connecting the one or more RF chains to the transmit antennas of the selected one of the second plurality of possible subsets.

9. The method according to claim 8, wherein the second plurality of output bit error rates are approximated by a closed-form expression.

10. The method according to claim 9, wherein the closed-form expression is one of a) $y=-\tan h(x)$, b) $y=-[(1-e^{-2\sqrt{x}})+(1-e^{-1.8x})]$, c) $y=-[(1-e^{-1.3\sqrt{x}})+(1-e^{-x})]$, d) $y=-(1-e^{-0.2x})$, or e) $y=-(1-e^{-0.35\sqrt{x}})$.

11. The method according to claim 9, wherein the closed-form expression is dependent upon coding and/or modulation of the plurality of RF output signals.

12. The method according to claim 9, wherein the closed-form expression comprises a function of an output signal to noise ratio or an output signal-to-noise-and interference ratio of the receiver.

13. The method according to claim 8, wherein the plurality of RF output signals comprises at least one of: a code division multiple access signal, a single carrier signal, an orthogonal frequency division multiplexed signal and a UWB signal.

14. The method according to claim 8, wherein the first plurality of transmit antennas are greater in number than the one or more RF chains and wherein a size of each of the second plurality of possible subsets is equivalent to a number of the one or more RF chains.

15. In a communication system including a transmitter having a plurality of transmit antennas disposed to transmit a set of spatially-multiplexed RF output signals through a channel using two or more transmit RF chains and a receiver having a plurality of receive antennas disposed to receive the set of spatially-multiplexed RF output signals and to responsively generate a set of spatially-multiplexed received RF signals processed by two or more receive RF chains, an antenna selection method comprising:

establishing possible subsets of the plurality of transmit antennas and possible subsets of the plurality of receive antennas for each possible coding rate;

determining a maximum date rate among the possible subsets of the plurality of transmit antennas and the possible subsets of the plurality of receive antennas for each coding rate;

selecting the coding rate with the highest maximum data rate;

determining one or more output bit error rates of the receiver corresponding to combinations of ones of the possible subsets of the plurality of transmit antennas and ones of the possible subsets of the plurality of receive antennas for the selected coding rate;

identifying a minimum of the one or more output bit error rates for the selected coding rate;

selecting one of the possible subsets of the plurality of transmit antennas and one of the possible subsets of the plurality of receive antennas collectively corresponding to the minimum of the one or more output bit error rates for the selected coding rate; and connecting the two or more of the transmit RF chains to the selected one of the possible subsets of the plurality of transmit antennas and the two or more receive RF chains to the selected one of the possible subsets of the plurality of receive antennas.

16. The method according to claim 15, wherein the one or more output bit error rates are approximated by one or more closed-form expressions.

17. The method according to claim 16, wherein the one or more closed-form expressions comprise a) $y=-\tan h(x)$, b) $y=-[(1-e^{-2\sqrt{x}})+(1-e^{-1.8x})]$, c) $y=-[(1-e^{-1.3\sqrt{x}})+(1-e^{-x})]$, d) $y=-(1-e^{-0.2x})$, or e) $y=-(1-e^{-0.35\sqrt{x}})$.

18. The method according to claim 16, wherein the one or more closed-form expressions are dependent upon coding and/or modulation of the set of spatially-multiplexed RF output signals.

19. The method according to claim 16, wherein the one or more closed-form expressions comprise a function of one or more output signal to noise ratios or one or more output signal-to-noise-and interference ratios of the receiver.

20. The method according to claim 15, further comprising:
performing a splitting and weighting operation upon plural baseband input signals utilizing a set of baseband weighting values in order to form a set of baseband signals wherein the set of spatially-multiplexed RF output signals are generated based upon one or more of the set of baseband signals.

21. The method according to claim 15, further comprising:
downconverting the set of spatially-multiplexed received RF signals in order to form a set of baseband signals, and
performing a baseband weighting and combining operation upon the set of baseband signals utilizing a set of baseband weighting values.

22. The method according to claim 15, wherein the set of spatially-multiplexed RF output signals comprises at least one of: a code division multiple access signal, a single carrier signal, an orthogonal frequency division multiplexed signal and a UWB signal.

23. The method according to claim 15, wherein the plurality of transmit antennas are greater in number than the two or more transmit RF chains and wherein the plurality of receive antennas are greater in number than the two or more receive RF chains.

24. In a communication system including a transmitter having a plurality of transmit antennas disposed to transmit a set of RF output signals through a channel using one or more transmit RF chains and a receiver having a plurality of receive antennas disposed to receive the set of RF output signals and to responsively generate a set of received RF signals processed by one or more receive RF chains, an antenna selection method comprising:
establishing possible subsets of the plurality of transmit antennas and possible subsets of the plurality of receive antennas for each possible coding rate;
determining a maximum date rate among the possible subsets of the plurality of transmit antennas and the possible subsets of the plurality of receive antennas for each coding rate;
selecting the coding rate with the highest maximum data rate;
determining one or more output bit error rates of the receiver corresponding to combinations of ones of the possible subsets of the plurality of transmit antennas and ones of the possible subsets of the plurality of receive antennas for the selected coding rate;
identifying a minimum of the one or more output bit error rates for the selected coding rate;
selecting one of the possible subsets of the plurality of transmit antennas and one of the possible subsets of the plurality of receive antennas collectively corresponding to the minimum of the one or more output bit error rates for the selected coding rate; and
connecting the one or more of the transmit RF chains to the selected one of the possible subsets of the plurality of transmit antennas and the one or more receive RF chains to the selected one of the possible subsets of the plurality of receive antennas.

25. The method according to claim 24, further comprising:
performing a splitting and weighting operation upon an input baseband signal utilizing a set of transmit baseband weighting values in order to form a set of baseband signals wherein the plurality of RF output signals are generated based upon one or more of the set of transmit baseband signals.

26. The method according to claim 25, wherein the set of transmit baseband weighting values are determined based upon precoding or space-time coding techniques.

27. The method according to claim 24, further comprising:
downconverting the set of received RF signals in order to form a set of baseband signals, and
performing a baseband weighting and combining operation upon the set of baseband signals utilizing a set of receive baseband weighting values.

28. The method according to claim 27, wherein the set of transmit and receive baseband weights are respectively obtained from a right and left singular vector of a channel matrix corresponding to the one of the possible subsets of the plurality of transmit antennas and the one of the possible subsets of the plurality of receive antennas.

29. The method according to claim 24, wherein the one or more output bit error rates are approximated by a closed-form expression.

30. The method according to claim 29, wherein the closed-form expression is one of a) $y=-\tan h(x)$, b) $y=-[(1-e^{-2\sqrt{x}})+(1-e^{-1.8x})]$, c) $y=-[(1-e^{-1.3\sqrt{x}})+(1-e^{-x})]$, d) $y=-(1-e^{-0.2x})$, or e) $y=-(1-e^{-0.35\sqrt{x}})$.

31. The method according to claim 29, wherein the closed-form expression is dependent upon coding and/or modulation of the set of RF output signals.

32. The method according to claim 29, wherein the closed-form expression comprises a function of an output signal to noise ratio or an output signal-to-noise-and interference ratio of the receiver.

33. The method according to claim 24, wherein the set of RF output signals comprises at least one of: a code division multiple access signal, a single carrier signal, an orthogonal frequency division multiplexed signal and a UWB signal.

34. The method according to claim 24, wherein the plurality of transmit antennas are greater in number than the one or more transmit RF chains and wherein the plurality of receive antennas are greater in number than the one or more receive RF chains.

35. A method for selecting N antenna elements in an M-antenna-element transmitter or an M-antenna-element receiver, in which N is less than M, comprising:
(a) determining a maximum date rate among all possible N antenna element subsets of a set of M-antenna elements of the M-antenna element transmitter or the M-antenna-element receiver for each possible coding rate;
(b) selecting the coding rate with the highest maximum data rate;
(c) determining a bit error rate for each possible N antenna element subset of a set of M-antenna elements of the M-antenna element transmitter or the M-antenna-element receiver for the selected coding rate;
(d) determining the particular N antenna element subset with a lowest bit error rate for the selected coding rate; and
(e) coupling N RF chains of the M-antenna-element transmitter or the M-antenna-element receiver to the particular N antenna element subset with the lowest bit error rate in response to the determination in (d).

36. The method according to claim 35, wherein (c) comprises approximating the bit error rate using a closed-form mathematical expression.

37. The method according to claim 35, further comprising:
executing a link adaptation algorithm to determine a most efficient coding mode or modulation mode.

38. The method according to claim 37, wherein (d) comprises determining the particular N antenna element subset with a lowest bit error rate for a particular coding mode or for a particular modulation mode.

39. A system for selecting N antenna elements in an M-antenna-element transmitter or an M-antenna-element receiver, in which N is less than M, comprising:

M antenna elements in the M-antenna-element transmitter or the M-antenna-element receiver;

N RF chains; and a switch coupled to the N RF chains, wherein a maximum date rate for each possible coding rate is determined among all possible N antenna element subsets of a set of M-antenna elements of the M-antenna element transmitter or the M-antenna-element receiver for each coding rate, wherein a coding rate is selected with the highest maximum data rate;

wherein the M-antenna-element receiver determines a bit error rate for each possible N antenna element subset of the M antenna elements for the selected coding rate, wherein the M-antenna-element receiver determines the particular N antenna element subset with a lowest bit error rate for the selected coding rate; and wherein, in response to the determination of the particular N antenna element subset with the lowest bit error rate, the switch couples the N RF chains to the particular N antenna element subset with the lowest bit error rate.

* * * * *

UNITED STATES PATENT AND TRADEMARK OFFICE
CERTIFICATE OF CORRECTION

PATENT NO. : 7,483,718 B2
APPLICATION NO. : 10/957398
DATED : January 27, 2009
INVENTOR(S) : Severine-Catreux-Erceg et al.

It is certified that error appears in the above-identified patent and that said Letters Patent is hereby corrected as shown below:

Column 23, line 16 delete "y=–tan h(x)" and insert -- $y = -\tanh(x)$ --.

Column 23, line 65 delete "y=–tan h(x)" and insert -- $y = -\tanh(x)$ --.

Column 24, line 56 delete "y=–tan h(x)" and insert -- $y = -\tanh(x)$ --.

Column 26, line 17 delete "y=–tan h(x)" and insert -- $y = -\tanh(x)$ --.

Signed and Sealed this

Sixteenth Day of June, 2009

JOHN DOLL
*Acting Director of the United States Patent and Trademark Office*